United States Patent
(10) Patent No.: US 8,144,149 B2
Jiao et al.
(45) Date of Patent: Mar. 27, 2012

(54) SYSTEM AND METHOD FOR DYNAMICALLY LOAD BALANCING MULTIPLE SHADER STAGES IN A SHARED POOL OF PROCESSING UNITS

(75) Inventors: Yang (Jeff) Jiao, San Jose, CA (US); Yijung Su, Alviso, CA (US)

(73) Assignee: Via Technologies, Inc., Taipei (TW)

( * ) Notice: Subject to any disclaimer, the term of this patent is extended or adjusted under 35 U.S.C. 154(b) by 920 days.

(21) Appl. No.: 11/406,543

(22) Filed: Apr. 19, 2006

(65) Prior Publication Data

US 2007/0091089 A1 Apr. 26, 2007

Related U.S. Application Data

(60) Provisional application No. 60/755,385, filed on Dec. 30, 2005, provisional application No. 60/726,781, filed on Oct. 14, 2005.

(51) Int. Cl.
*G06T 15/50* (2011.01)
(52) U.S. Cl. ........ 345/426; 345/419; 345/543; 345/557; 345/506; 711/125; 711/153; 711/154; 711/170; 718/100; 718/103; 718/104; 718/105
(58) Field of Classification Search .................. 345/419, 345/423, 506, 531, 537, 543, 520, 426, 557; 711/125, 153, 154, 170; 718/100, 103, 104, 718/105
See application file for complete search history.

(56) References Cited

U.S. PATENT DOCUMENTS

| | | | |
|---|---|---|---|
| 5,826,081 A * | 10/1998 | Zolnowsky | 718/103 |
| 6,510,498 B1 | 1/2003 | Holzle et al. | |
| 6,539,464 B1 | 3/2003 | Getov | |
| 6,578,065 B1 | 6/2003 | Aglietti et al. | |
| 6,651,082 B1 * | 11/2003 | Kawase et al. | 718/105 |
| 6,779,182 B1 | 8/2004 | Zolnowsky | |
| 6,842,853 B1 | 1/2005 | Bush et al. | |
| 7,151,544 B2 * | 12/2006 | Emberling | 345/582 |
| 7,289,125 B2 * | 10/2007 | Diard et al. | 345/501 |
| 7,299,468 B2 * | 11/2007 | Casey et al. | 718/104 |
| 7,355,601 B2 * | 4/2008 | Andrews et al. | 345/505 |
| 7,404,056 B1 * | 7/2008 | Nordquist | 711/166 |
| 7,454,599 B2 | 11/2008 | Jiao et al. | |
| 7,692,660 B2 | 4/2010 | Markovic et al. | |
| 2003/0046517 A1 | 3/2003 | Lauterbach | |

(Continued)

FOREIGN PATENT DOCUMENTS

CN 1056968 A 12/1991

(Continued)

*Primary Examiner* — Andrew Wang
*Assistant Examiner* — Abderrahim Merouan
(74) *Attorney, Agent, or Firm* — Thomas, Kayden, Horstemeyer & Risley, LLP

(57) ABSTRACT

The present disclosure is directed to novel methods and apparatus for managing or performing the dynamic allocation or reallocation of processing resources among a vertex shader, a geometry shader, and pixel shader of a graphics processing unit. In one embodiment a method for graphics processing comprises assigning at least one execution unit to each of a plurality of shader units, the plurality of shader units comprising a vertex shader, a geometry shader, and a pixel shader, wherein an execution unit assigned to a given shader unit performs processing tasks for only that shader unit, determining that one of the plurality of shader units is bottlenecked, and reassigning at least one execution unit from a non-bottlenecked shader unit to the shader unit determined to be bottlenecked.

11 Claims, 18 Drawing Sheets

U.S. PATENT DOCUMENTS

| | | | |
|---|---|---|---|
| 2003/0169269 A1* | 9/2003 | Sasaki et al. | 345/581 |
| 2003/0217112 A1* | 11/2003 | Emmot | 709/208 |
| 2003/0231645 A1 | 12/2003 | Chandra et al. | |
| 2004/0003188 A1 | 1/2004 | Rao | |
| 2004/0012597 A1* | 1/2004 | Zatz et al. | 345/501 |
| 2004/0021670 A1* | 2/2004 | Emmot et al. | 345/531 |
| 2004/0085322 A1* | 5/2004 | Alcorn et al. | 345/562 |
| 2004/0128401 A1 | 7/2004 | Fallon et al. | |
| 2004/0130552 A1* | 7/2004 | Duluk et al. | 345/506 |
| 2004/0187120 A1 | 9/2004 | Moore et al. | |
| 2004/0207630 A1 | 10/2004 | Moreton et al. | |
| 2004/0226014 A1 | 11/2004 | Moore | |
| 2005/0044316 A1* | 2/2005 | Kottomtharayil et al. | 711/115 |
| 2005/0081182 A1* | 4/2005 | Minor et al. | 717/100 |
| 2005/0086658 A1 | 4/2005 | Wilding et al. | |
| 2005/0122334 A1* | 6/2005 | Boyd et al. | 345/520 |
| 2005/0190192 A1* | 9/2005 | Emmot et al. | 345/502 |
| 2005/0219253 A1 | 10/2005 | Piazza et al. | |
| 2005/0243094 A1* | 11/2005 | Patel et al. | 345/506 |
| 2005/0280652 A1* | 12/2005 | Hutchins et al. | 345/557 |
| 2006/0092162 A1* | 5/2006 | Deering et al. | 345/506 |
| 2007/0014486 A1* | 1/2007 | Schiwietz et al. | 382/276 |
| 2007/0103474 A1* | 5/2007 | Huang et al. | 345/506 |
| 2007/0165035 A1* | 7/2007 | Duluk et al. | 345/506 |
| 2008/0192063 A1* | 8/2008 | Liao et al. | 345/582 |

FOREIGN PATENT DOCUMENTS

CN 1928918 A 3/2007

\* cited by examiner

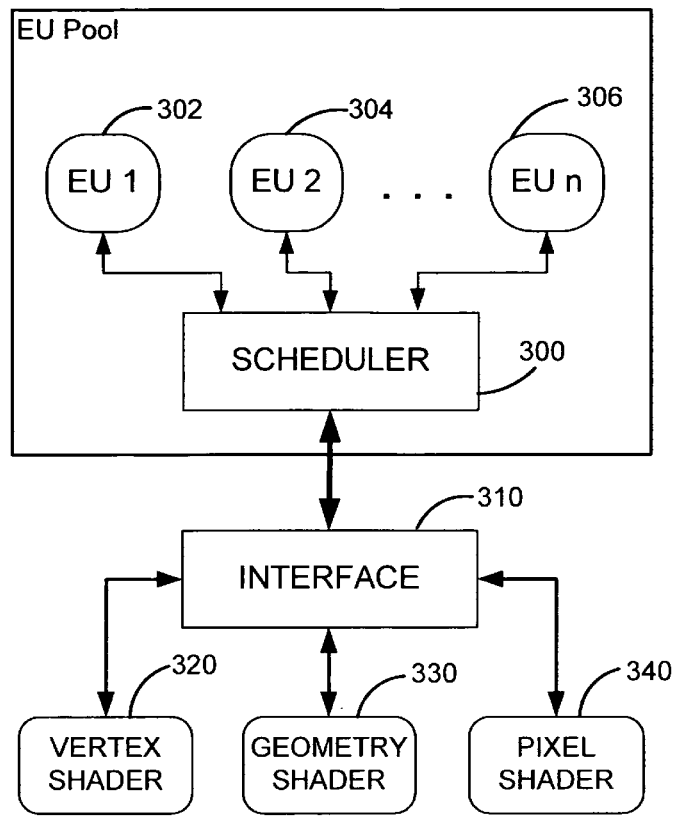
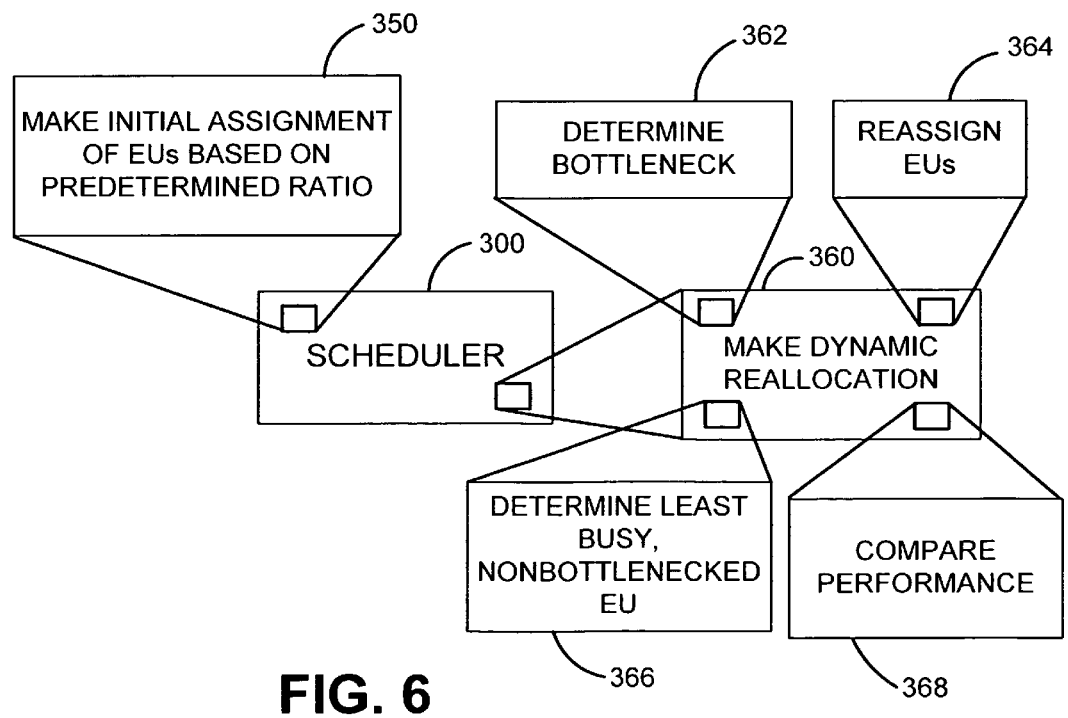

SYSTEM AND METHOD FOR DYNAMICALLY LOAD BALANCING MULTIPLE SHADER STAGES IN A SHARED POOL OF PROCESSING UNITS

CROSS-REFERENCE TO RELATED APPLICATIONS

This application is related to co-pending application Ser. No. 11/954,621 filed Dec. 12, 2007.

This application claims the benefit of provisional patent application filed Dec. 30, 2005, entitled "System and Method for Managing the Computation of Graphics Shading Operations," and assigned Ser. No. 60/755,385, the contents of which are incorporated by reference herein. This application further claims the benefit of provisional patent application filed Oct. 14, 2005, also entitled "System and Method for Managing the Computation of Graphics Shading Operations," and assigned Ser. No. 60/726,781. The present application is also related to application Ser. No. 11/406,536, filed on the same day herewith.

FIELD OF THE DISCLOSURE

The present disclosure relates generally to graphics processing and, more particularly, to systems and methods of load balancing multiple shader stages in a shared pool of processing units.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (X, Y, Z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For 3-D objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixels are positioned in the polygon and attempts to write the associated color values and depth (Z value) into frame buffer cover. The rasterizer compares the depth (Z value) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

With this general background provided, reference is now made to FIG. 1, which shows a functional flow diagram of certain components within a graphics pipeline in a computer graphics system. It will be appreciated that components within graphics pipelines may vary among different systems, and may be illustrated in a variety of ways. As is known, a host computer 10 (or a graphics API running on a host computer) may generate a command list through a command stream processor 12. The command list comprises a series of graphics commands and data for rendering an "environment" on a graphics display. Components within the graphics pipeline may operate on the data and commands within the command list to render a screen in a graphics display.

In this regard, a parser 14 may receive commands from the command stream processor 12 and "parse" through the data to interpret commands and pass data defining graphics primitives along (or into) the graphics pipeline. In this regard, graphics primitives may be defined by location data (e.g., X, Y, Z, and W coordinates) as well as lighting and texture information. All of this information, for each primitive, may be retrieved by the parser 14 from the command stream processor 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a Z-test 20 is performed on each pixel within the primitive. As is known, comparing a current Z-value (i.e., a Z-value for a given pixel of the current primitive) with a stored Z-value for the corresponding pixel location performs a Z-test. The stored Z-value provides the depth value for a previously rendered primitive for a given pixel location. If the current Z-value indicates a depth that is closer to the viewer's eye than the stored Z-value, then the current Z-value will replace the stored Z-value and the current graphic information (i.e., color) will replace the color information in the corresponding frame buffer pixel location (as determined by the pixel shader 22). If the current Z-value is not closer to the current viewpoint than the stored Z-value, then neither the frame buffer nor Z-buffer contents need to be replaced, as a previously rendered pixel will be deemed to be in front of the current pixel. For pixels within primitives that are rendered and determined to be closer to the viewpoint than previously-stored pixels, information relating to the primitive is passed on to the pixel shader 22, which determines color information for each of the pixels within the primitive that are determined to be closer to the current viewpoint.

Optimizing the performance of a graphics pipeline can require information relating to the source of pipeline inefficiencies. The complexity and magnitude of graphics data in a pipeline suggests that pipeline inefficiencies, delays, and bottlenecks can significantly compromise the performance of the pipeline. In this regard, identifying sources of aforementioned data flow or processing problems is beneficial.

SUMMARY

The present disclosure is directed to novel methods and apparatus for managing or performing the dynamic allocation or reallocation of processing resources among a vertex shader, a geometry shader, and pixel shader of a graphics processing unit. In one embodiment a method for graphics processing comprises assigning at least one execution unit to each of a plurality of shader units, the plurality of shader units comprising a vertex shader, a geometry shader, and a pixel shader, wherein an execution unit assigned to a given shader unit performs processing tasks for only that shader unit, determining that one of the plurality of shader units is bottlenecked, and reassigning at least one execution unit from a non-bottlenecked shader unit to the shader unit determined to be bottlenecked.

The execution units of a pool of execution units are individually scheduled to perform shader-related computations, such that a given execution unit can be scheduled over time to perform shader operations for different shader stages. As prior art systems employ dedicated shader hardware, such a dynamic and robust thread assignment was not implemented or realized.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a block diagram illustrating a pool of execution units and a scheduler in accordance with an embodiment of the present invention.

FIG. 6 is a block diagram illustrating certain sub-parts of a scheduler constructed in accordance with certain embodiments of the present invention.

DETAILED DESCRIPTION OF THE EMBODIMENTS

Figure 1:
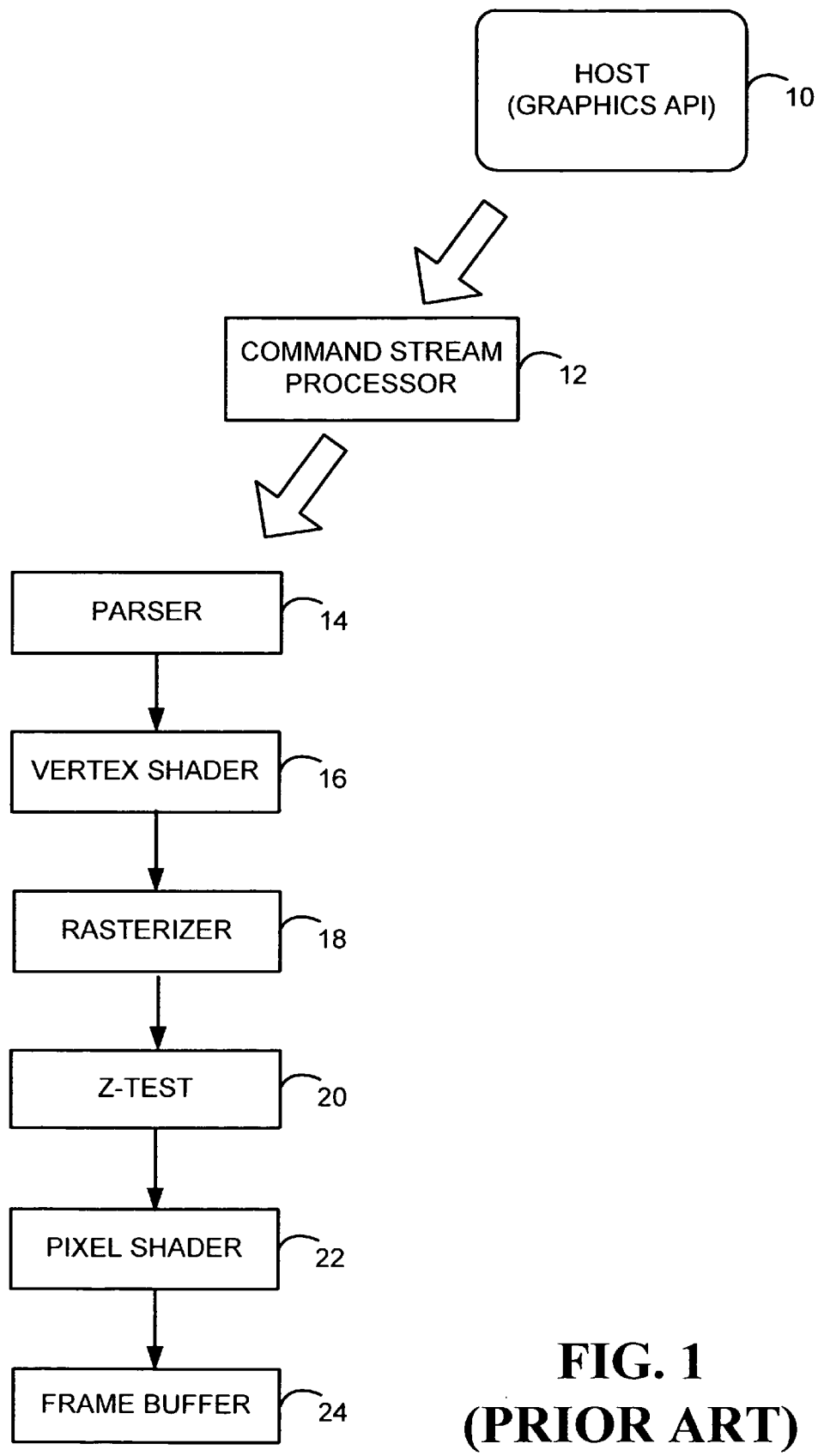
FIG. 1 is a block diagram illustrating blocks or portions of a fixed-function graphics processor, as is known in the prior art.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
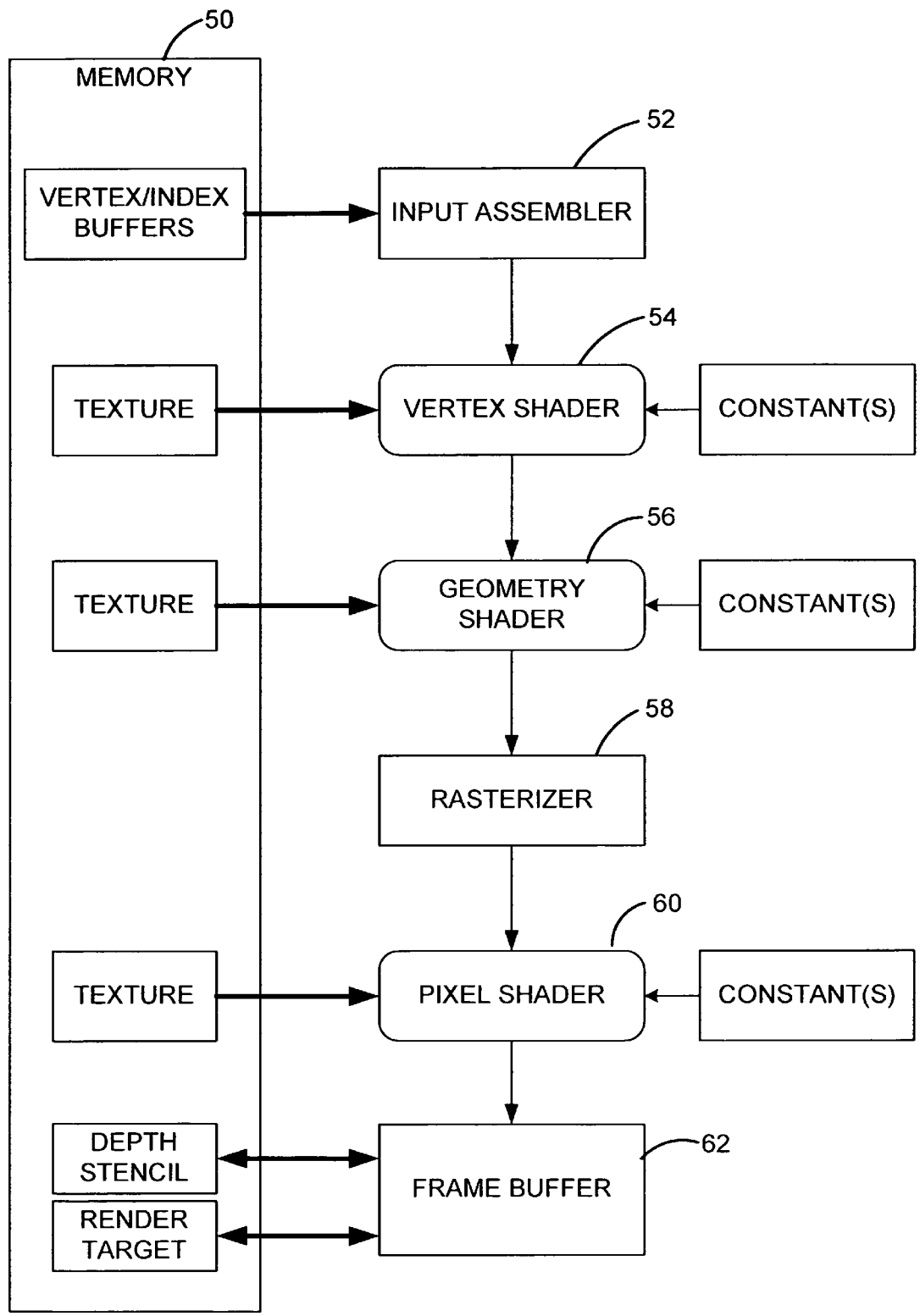
FIG. 2 is a block diagram illustrating stages or portions of a graphics processor constructed in accordance with embodiments of the invention.

Reference is now made to FIG. 2 which is a block diagram illustrating certain components in an embodiment of the invention. Specifically, the components illustrated in FIG. 2 comprise principle components of a pipelined graphics processor configured to implement or carryout embodiments of the present invention. The first component is designated as an input assembler 52, which essentially receives or reads vertices out of memory, which vertices are used to form geometry and create working items for the pipeline. In this regard, the input assembler 52 reads data from memory and from that data generates triangles, lines, points, or other primitives to be introduced into the pipeline. This geometry information, once assembled, is passed to the vertex shader 54. The vertex shader 54, as is known, processes vertices, by performing operations such as transformations, scanning, and lighting. Thereafter, the vertex shader 54 passes data to the geometry shader 56. The geometry shader 56 receives, as inputs, vertices for a full primitive, and is capable of outputting multiple vertices that form a single topology, such as a triangle strip, a line strip, point list, etc. The geometry shader 56 may be further configured to perform the various algorithms, such as tessellation, shadow volume generation, etc. The geometry shader then outputs information to a rasterizer 58, which is responsible for clipping, primitive setup, and determining when and/or how to invoke the pixel shader 60. The pixel shader 60, is invoked for each pixel covered by the primitive that is output by the rasterizer. As is known, the pixel shader 60 operates to perform interpolations and other operations that collectively determine pixel colors for output to a frame buffer 62. The functioning operation of the various components illustrated in FIG. 2 are well known to persons skilled in the art, and need not be described herein. In this regard, as will be further described herein, the present invention is directed to systems and methods for performing dynamic scheduling of a general purpose, replicated processing architecture that performs shared processing of operations and tasks of the vertex shader 54, geometry shader 56, and pixel shader 60. Therefore, the specific implementation and operation internal to these units need not be described herein to gain and appreciate a full understanding of the present invention.

Figure 3:
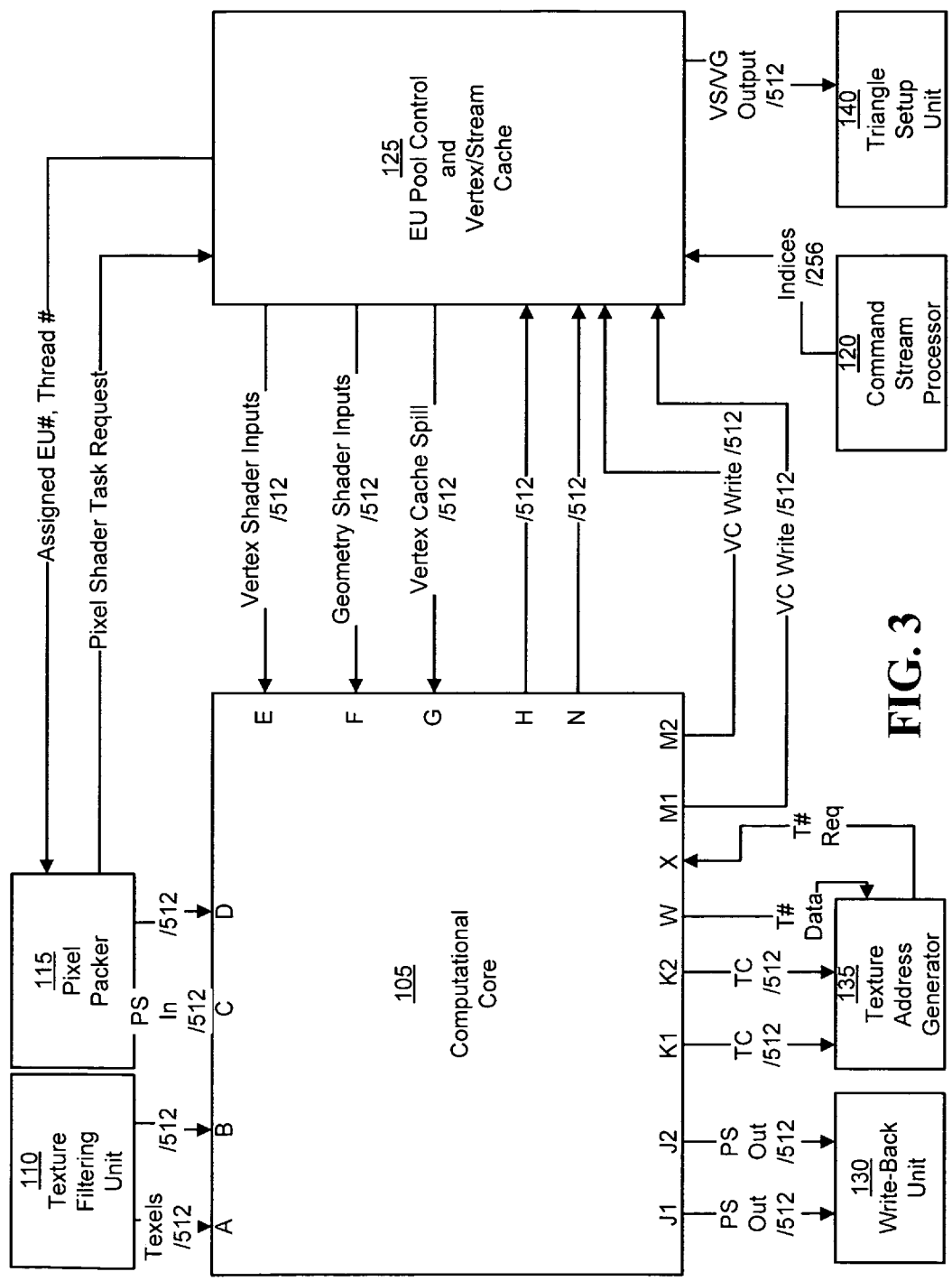
FIG. 3 is a block diagram illustrating portions of a processor environment of a graphics processor constructed in accordance with embodiments of the invention.

Reference is now made to FIG. 3, which is a block diagram showing an example processor environment for a graphics processor, constructed in accordance with embodiments of the invention. While not all components for graphics processing are shown, the components shown in FIG. 3 should be sufficient for one having ordinary skill in the art to understand the general functions and architecture related to such graphics processors. At the center of the processing environment is a computational core 105, which processes various instructions. That computational core 105, for multi-issue processors, is capable of processing multiple instructions within a single clock cycle.

As shown in FIG. 3, the relevant components of the graphics processor include the computational core 105, a texture filtering unit 110, a pixel packer 115, a command stream processor 120, a write-back unit 130, and a texture address generator 135. Also included in FIG. 3 is an execution unit (EU) pool control unit 125, which also includes a vertex cache and/or a stream cache. The computational core 105 receives inputs from various components and outputs to various other components.

For example, as shown in FIG. 3, the texture filtering unit 110 provides texel data to the computational core 105 (inputs A and B). For some embodiments, the texel data is provided as 512-bit data, thereby corresponding to the data structures defined below.

The pixel packer 115 provides pixel shader inputs to the computational core 105 (inputs C and D), also in 512-bit data format. Additionally, the pixel packer 115 requests pixel shader tasks from the EU pool control unit 125, which provides an assigned EU number and a thread number to the pixel packer 115. Since pixel packers and texture filtering units are known in the art, further discussion of these components is omitted here. While FIG. 3 shows the pixel and texel packets as 512-bit data packets, it should be appreciated that the size of the packets can be varied for other embodiments, depending on the desired performance characteristics of the graphics processor.

The command stream processor 120 provides triangle vertex indices to the EU pool control unit 125. In the embodiment of FIG. 3, the indices are 256-bits. The EU pool control unit 125 assembles vertex shader inputs from the stream cache and sends data to the computational core 105 (input E). The EU pool control unit 125 also assembles geometry shader inputs and provides those inputs to the computational core 105 (input F). The EU pool control 125 also controls the EU input 235 and the EU output 220. In other words, the EU pool control 125 controls the respective inflow and outflow to the computational core 105.

Upon processing, the computational core 105 provides pixel shader outputs (outputs J1 and J2) to the write-back unit 130. The pixel shader outputs include red/green/blue/alpha (RGBA) information, which is known in the art. Given the data structure in the disclosed embodiment, the pixel shader output may be provided as two 512-bit data streams. Other bit-widths may also be implemented in other embodiments.

Similar to the pixel shader outputs, the computational core 105 outputs texture coordinates (outputs K1 and K2), which include UVRQ information, to the texture address generator 135. The texture address generator 135 issues a texture request (T# Req) to the computational core 105 (input X), and the computational core 105 outputs (output W) the texture data (T# data) to the texture address generator 135. Since the various examples of the texture address generator 135 and the write-back unit 130 are known in the art, further discussion of those components is omitted here. Again, while the UVRQ and the RGBA are shown as 512 bits, it should be appreciated that this parameter may also be varied for other embodiments. In the embodiment of FIG. 3, the bus is separated into two 512-bit channels, with each channel holding the 128-bit RGBA color values and the 128-bit UVRQ texture coordinates for four pixels.

The computational core 105 and the EU pool control unit 125 may also transfer to each other 512-bit vertex cache spill data. Additionally, two 512-bit vertex cache writes are illustrated as output from the computational core 105 (outputs M1 and M2) to the EU pool control unit 125 for further handling.

Figure 4:
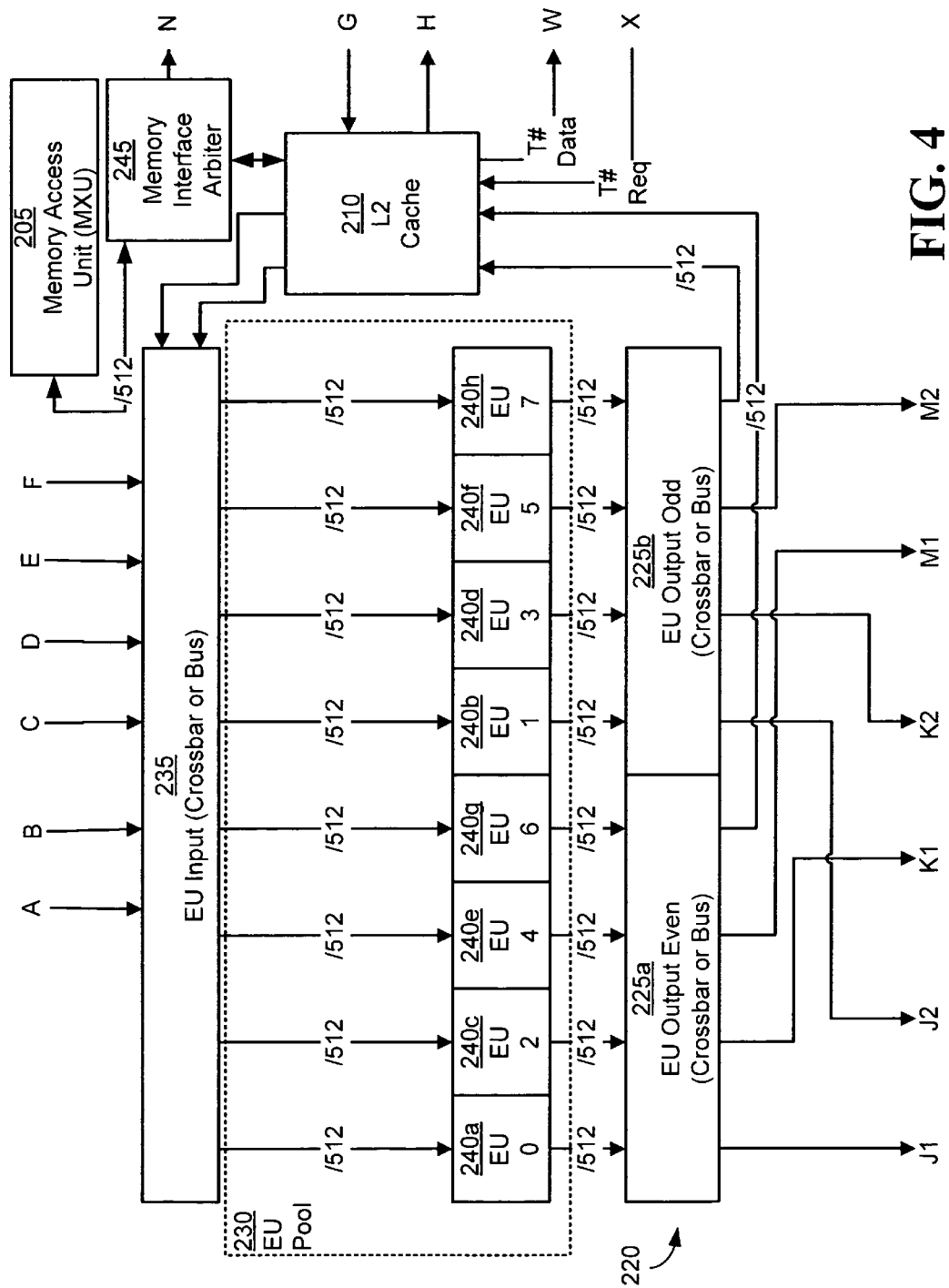
FIG. 4 is a block diagram illustrating components within the computational core of the graphics processor illustrated in FIG. 3.

Having described the data exchange external to the computational core 105, attention is turned to FIG. 4, which shows a block diagram of various components within the computational core 105. As shown in FIG. 4, the computational core 105 comprises a memory access unit 205 that is coupled to a level-2 (L2) cache 210 through a memory interface arbiter 245.

The L2 cache 210 receives vertex cache spill (input G) from the EU pool control unit 125 (FIG. 3) and provides vertex cache spill (output H) to the EU pool control unit 125 (FIG. 3). Additionally, the L2 cache receives T# requests (input X) from the texture address generator 135 (FIG. 3), and provides the T# data (output W) to the texture address generator 135 (FIG. 3) in response to the received request.

The memory interface arbiter 245 provides a control interface to the local video memory (frame buffer). While not shown, a bus interface unit (BIU) provides an interface to the system through, for example, a PCI express bus. The memory interface arbiter 245 and BIU provide the interface between the memory and an execution unit (EU) pool L2 cache 210. For some embodiments, the EU pool L2 cache connects to the memory interface arbiter 245 and the BIU through the memory access unit 205. The memory access unit 205 translates virtual memory addresses from the L2 cache 210 and other blocks to physical memory addresses.

The memory interface arbiter 245 provides memory access (e.g., read/write access) for the L2 cache 210, fetching of instructions/constants/data/texture, direct memory access (e.g., load/store), indexing of temporary storage access, register spill, vertex cache content spill, etc.

The computational core 105 also comprises an execution unit pool 230, which includes multiple execution units (EUs) 240a ... 240h (collectively referred to herein as 240), each of which includes an EU control and local memory (not shown). Each of the EUs 240 are capable of processing multiple instructions within a single clock cycle. Thus, the EU pool 230, at its peak, can process multiple threads substantially simultaneously. These EUs 240, and their substantially concurrent processing capacities, are described in greater detail below. While eight (8) EUs 240 are shown in FIG. 4 (labeled EU0 through EU7), it should be appreciated that the number of EUs need not be limited to eight, but may be greater or fewer in number for other embodiments.

The computational core 105 further comprises an EU input 235 and an EU output 220, which are respectively configured to provide the inputs to the EU pool 230 and receive the outputs from the EU pool 230. The EU input 235 and the EU output 220 may be crossbars or buses or other known input mechanisms.

The EU input 235 receives the vertex shader input (E) and the geometry shader input (F) from the EU pool control 125 (FIG. 3), and provides that information to the EU pool 230 for processing by the various EUs 240. Additionally, the EU input 235 receives the pixel shader input (inputs C and D) and the texel packets (inputs A and B), and conveys those packets to the EU pool 230 for processing by the various EUs 240. Additionally, the EU input 235 receives information from the L2 cache 210 (L2 read) and provides that information to the EU pool 230 as needed.

The EU output in the embodiment of FIG. 4 is divided into an even output 225$a$ and an odd output 225$b$. Similar to the EU input 235, the EU output 225 can be crossbars or buses or other known architectures. The even EU output 225$a$ handles the output from the even EUs 240$a$, 240$c$, 24$e$, 240$g$, while the odd EU output 225$b$ handles the output from the odd EUs 240$b$, 240$d$, 240$f$, 240$h$. Collectively, the two EU outputs 225$a$, 225$b$ receive the output from the EU pool 230, such as the UVRQ and the RGBA. Those outputs, among others, may be directed back to the L2 cache 210, or output from the computational core 105 to the write-back unit 130 (FIG. 1) through J1 and J2 or output to the texture address generator 135 (FIG. 3) through K1 and K2.

Having illustrated and described basic architectural components utilized by embodiments of the present invention, certain additional and/or alternative components and operational aspects of embodiments will be described. As summarized above, embodiments of the present invention are directed to systems and methods for improving the overall performance of a graphics processor. In this regard, performance of a graphics processor, as a whole, is proportionate to the quantity of data that is processed through the pipeline of the graphics processor. As described above, embodiments of the present invention utilize a vertex shader, geometry shader, and pixel shader. Rather than implementing the functions of these components as separated shader units with different designs and instruction sets, the operations are instead executed by a pool of execution units 301, 302, . . . 304 with a unified instruction set. Each of these execution units is identical in design and configurable for programmed operation. In a preferred embodiment, each execution unit is capable of multi-threaded operation, and more specifically, for managing the operation of 64 threads simultaneously. In other embodiments, differing numbers of threads may be implemented. As various shading tasks are generated by the vertex shader 320, geometry shader 330, and pixel shader 340, they are delivered to the respective execution units (via interface 310 and scheduler 300) to be carried out.

As individual tasks are generated, the scheduler 300 handles the assigning of those tasks to available threads within the various execution units. As tasks are completed, the scheduler 300 further manages the release of the relevant threads. This thread execution management is performed by a portion of the scheduler 300. In this regard, a portion of the scheduler 300 is responsible for assigning vertex shader, geometry shader, and pixel shader tasks/threads to the various execution units, and the portion also performs the associated "bookkeeping." Specifically, the scheduler maintains a resource table (not specifically illustrated) of threads and memories for all execution units. The scheduler 300 particularly knows which threads have been assigned tasks and are occupied, which threads have been released after thread termination, how many common register file memory registers are occupied, and how much free space is available for each execution unit.

Accordingly, when a task is assigned to one execution unit (e.g., 302), the scheduler 300 will mark the thread as busy and subtract the total available common register file memory by the amount of the appropriate register file footprint for each thread. This footprint is set or determined by states for the vertex shader, geometry shader, and pixel shader. Further, each of the shader stages may have different footprint sizes. For example, a vertex shader thread may require 10 common register file registers, while a pixel shader thread may only require 5 such registers.

When a thread completes its assigned task(s), the execution unit running the thread sends an appropriate signal to the scheduler 300. The scheduler 300 will, in turn, update its resource table to mark the thread as free and to add the amount of total thread common register file space back to the available space. When all threads are busy or all of the common register file memory has been allocated (or there is too little register space remaining to accommodate an additional thread), then the execution unit is considered full and the scheduler 300 will not assign any additional or new threads to that execution unit.

A thread controller (not specifically illustrated) is also provided inside each of the execution units, and this thread controller is responsible for managing or marking each of the threads as active (e.g., executing) or available. As multi-threaded execution devices and management of multi-threaded execution is known, further details regarding the thread execution management of the individual execution units need not be described herein.

Embodiments of the scheduler 300 may be configured to perform such scheduling in two levels. A first-level or low-level scheduling and a second-level or high-level scheduling. The first-level scheduling operates to assign vertex shader, geometry shader, and pixel shader tasks to the pool of execution units that are assigned to the respective shader stage. That is, vertex shader tasks are assigned to the pool of execution units that are assigned to the vertex shader stage. This first-level scheduling is performed individually for each of the vertex shader, geometry shader, and pixel shader to select a particular execution unit and one thread to process a task request (e.g., the task to be scheduled). The assignment of the various threads may be handled in a round-robin style. For example, if three execution units are assigned to the geometry shader stage, then a first task from the geometry shader will be sent to a thread of the first execution unit, a second task to the second execution unit, and so on.

The second-level scheduling is concerned with managing the assignment of execution units to the various shader stages, so as to perform an effective load balancing among the vertex shader, geometry shader, and pixel shader stages.

It should be appreciated that, in certain embodiments, a single level of scheduling could be performed, such that individual tasks are assigned on a load-balancing basis. In such a system, all execution units would be available to process tasks from any of the shader stages. Indeed, at any given time, each execution unit may have threads actively performing tasks for each of the shader stages. In should be appreciated that the scheduling algorithm of such an embodiment is more complex in implementation than the efficient two-level scheduling methodology described herein.

It should be appreciated that "decoupling" first and second level scheduling doesn't necessarily mean that EU-based allocation must be performed in the $2^{nd}$ level scheduling. In fact, a finer-grain load balancing allocation may be performed, for example, on a per thread basis (e.g., 80 threads allocated for vertex shader operations, 120 threads allocated for pixel shader operations, etc.). Thus, to separate first and second level scheduling only means to decouple decision-making of load balancing and handling of task request assignment. The description provided herein is provided for illustration purposes and should be understood in accordance with this overriding understanding.

Certain embodiments of the present invention are more specifically directed to the second-level scheduling operation that is performed by the scheduler 300. Specifically, at a higher level, the scheduler 300 operates to allocate and assign the various execution units 302, 304, . . . 306, to individual ones of the vertex shader 320, geometry shader 330, and pixel shader 340. Further, the scheduler 300 is configured to perform a load-balancing operation, which comprises a dynamic reassignment and reallocation of the various execution units as the respective workloads of the vertex shader 320, geometry shader 340, and pixel shader 340 so demand.

A goal of the $2^{nd}$ level scheduler is to make the loading of three shader stages (Vertex Shader (VS), Geometry Shader (GS) and Pixel Shader (PS)) reasonably balanced so that the entire pool of execution units (EU) achieves the best overall performance. There are many factors that would affect the loading of the VS, GS and PS, for example, the number of instructions executed for each VS, GS and PS task, the instruction execution efficiency, the initial input primitives to GS output primitives ratio, and the primitives to pixels ratio, which is affected by the size of triangles, the triangle culling and rejection rate, Z rejection rate, etc., and these factors may change constantly as well. The EU pool performance can be measured by the number of vertices, primitives and pixels output by the VS, GS and PS, or the overall EU utilization. The EU pool achieves the best performance when the overall EU utilization rate reaches the highest level. The overall EU utilization rate can be measured by the total instruction throughput (total number of instructions executed at every cycle) or the average EU instruction issue rate (average number of instructions executed per EU at every cycle). Given the number of EUs allocated to the VS, GS and PS, $n_{VS}$, $n_{GS}$, $n_{PS}$, and the average instruction throughput per EU $0<r_{VS}\leq r_{VS\ max}$, $0<r_{GS}\leq r_{GS\ max}$, $0<r_{PS}\leq r_{PS\ max}$, note that the maximum instruction throughput per EU that can be reached for different shader stage $r_{VS\ max}$, $r_{GS\ max}$, $r_{PS\ max}$ may differ depending on the shader program characteristics. As the total number of EUs is known as $N_{TOT}$, we have $$n_{VS}+n_{GS}+n_{PS}=N_{TOT}. \quad \text{Equation (1)}$$

Assuming the ratio between the vertices, primitives and pixels invocating or produced by the VS, GS and PS is constant and the shader program unchanged thus the average instruction executed per each shader instance (invocation) for each shader stage being constant, the ratio of total instructions executed between different shader stages will be constant, and the ratio of instruction throughput $n_i \times r_i$ between different shader stages will be constant and we have $$\frac{n_{VS} \times r_{VS}}{C_{VS}} = \frac{n_{GS} \times r_{GS}}{C_{GS}} = \frac{n_{PS} \times r_{PS}}{C_{PS}}. \quad \text{Equation (2)}$$

A desired performance is achieved when $$f(n_{VS},n_{GS},n_{PS})=n_{VS}\times r_{VS}+n_{GS}\times r_{GS}+n_{PS}\times r_{PS} \quad \text{Equation (3)}$$

reaches maximum value.

Similarly, if we use $r_i$ to represent the average throughput of vertices/primitives/pixels or outputted data produced by each shader stage per EU or the "drain rate" per EU, since the ratio between the vertices, primitives and pixels (or outputted data) produced by the VS, GS and PS $n_i \times r_i$ is constant, the equations are the same although with different $C_i$ values. Let's assume $n_i$ are real numbers. From (2) we have $$n_{GS} = \frac{r_{VS}/C_{VS}}{r_{GS}/C_{GS}}n_{VS}, \ n_{PS} = \frac{r_{VS}/C_{VS}}{r_{PS}/C_{PS}}n_{VS},$$

and substitute $n_{GS}$, $n_{PS}$ in (1) then $$n_{VS} = \frac{N_{TOT}}{1+\frac{r_{VS}/C_{VS}}{r_{GS}/C_{GS}}+\frac{r_{VS}/C_{VS}}{r_{PS}/C_{PS}}}, \quad \text{Equation (4)}$$

thus we have $$n_{GS} = \frac{N_{TOT}}{1+\frac{r_{GS}/C_{GS}}{r_{VS}/C_{VS}}+\frac{r_{GS}/C_{GS}}{r_{PS}/C_{PS}}} \quad \text{Equation (5)}$$

and $$n_{PS} = \frac{N_{TOT}}{1+\frac{r_{PS}/C_{PS}}{r_{VS}/C_{VS}}+\frac{r_{PS}/C_{PS}}{r_{GS}/C_{GS}}}. \quad \text{Equation (6)}$$

Substitute (4), (5) and (6) in (3) and we have $$f = n_{VS} \times r_{VS} + n_{GS} \times r_{GS} + n_{PS} \times r_{PS} = \quad \text{Equation (7)}$$
$$\frac{C_{VS}+C_{GS}+C_{PS}}{C_{VS}/r_{VS}+C_{GS}/r_{GS}+C_{PS}/r_{PS}}N_{TOT}.$$

Since function f is monotonically increasing for $r_{VS}$, $r_{GS}$, $r_{PS}>0$, f reaches the maximum value when $r_{VS}=r_{VS\ max}$ and $r_{GS}=r_{GS\ max}$ and $r_{PS}=r_{PS\ max}$. Given $r_{VS}=r_{VS\ max}$, $r_{GS}=r_{GS\ max}$, $r_{PS}=r_{PS\ max}$, solve equation (1) and (2')

$$\frac{n_{VS} \times r_{VSmax}}{C_{VS}} = \frac{n_{GS} \times r_{GSmax}}{C_{GS}} = \frac{n_{PS} \times r_{PSmax}}{C_{PS}}, \quad (2')$$

we have the ideal target allocation of VS, GS and PS that reaches the maximum performance $$n_{VS\_T} = \frac{N_{TOT}}{1+\frac{r_{VSmax}/C_{VS}}{r_{GSmax}/C_{GS}}+\frac{r_{VSmax}/C_{VS}}{r_{PSmax}/C_{PS}}}, \quad \text{Equation (4')}$$

-continued $$n_{GS\_T} = \frac{N_{TOT}}{1 + \frac{r_{GSmax}/C_{GS}}{r_{VSmax}/C_{VS}} + \frac{r_{GSmax}/C_{GS}}{r_{PSmax}/C_{PS}}}, \quad \text{Equation (5')}$$

$$n_{PS\_T} = \frac{N_{TOT}}{1 + \frac{r_{PSmax}/C_{PS}}{r_{VSmax}/C_{VS}} + \frac{r_{PSmax}/C_{PS}}{r_{GSmax}/C_{GS}}}. \quad \text{Equation (6')}$$

However, since the number of EUs or threads allocated for each shader stage is integer number; some granularity may be lost. For allocation scheme based on small granularity units, e.g. thread based or small block of threads based scheduling, we can use the integer part $\text{Int}(n_{i\_T})$ to approximate $n_{i\_T}$. Since the fraction parts have $\text{Frac}(n_{VS\_T}) + \text{Frac}(n_{GS\_T}) + \text{Frac}(n_{PS\_T}) = \text{frac\_sum} \leq 2$, we may round-robin assign the rest frac_sum number of threads or blocks of threads to the VS, GS and PS. However, for allocation scheme based on large granularity units e.g. EU-based scheduling, it's preferable to find the best allocation for the rest frac_sum (0~2) number of EUs. To find the best allocation means to find $N_i = \text{Int}(n_{i\_T})$ or $\text{Int}(n_{i\_T}) + 1$ so that $f(N_{VS}, N_{GS}, N_{PS}) = N_{VS} \times r_{VS} + N_{GS} \times r_{GS} + N_{PS} \times r_{PS}$ reaches the maximum value. Let's assume $$\frac{N_{VS} \times r_{VS}}{C_{VS}} = \frac{N_{GS} \times r_{GS}}{C_{GS}} = \frac{N_{PS} \times r_{PS}}{C_{PS}} = H,$$

so $f(N_{VS}, N_{GS}, N_{PS}) = C_{VS} \times H + C_{GS} \times H + C_{PS} \times H = (C_{VS} + C_{GS} + C_{PS}) \times H$ and the issue is translated to finding the maximum H. For the case frac_sum=2, only one shader stage has $N_i = \text{Int}(n_{i\_T})$ and the rest have $N_i = \text{Int}(n_{i\_T}) + 1$, we will select the shader stage that has largest $$H_k = \frac{\text{Int}(n_{k\_T}) \times r_{kmax}}{C_k} \left(\text{or equivalently largest } \frac{\text{Int}(n_{k\_T})}{n_{k\_T}}\right),$$

which is preferable and requires less computation) as $N_k = \text{Int}(n_{k\_T})$ and the rest of shader stages as $N_{i \neq k} = \text{Int}(n_{i\_T}) + 1$. For the case frac_sum=1, two shader stages have $N_i = \text{Int}(n_{i\_T})$ and one has $N_i = \text{Int}(n_{i\_T}) + 1$, we will select the shader stages that have $1^{st}$ and $2^{nd}$ largest $$H_k = \frac{\text{Int}(n_{k\_T}) \times r_{kmax}}{C_k} \left(\text{or equivalently largest } \frac{\text{Int}(n_{k\_T})}{n_{k\_T}}\right)$$

as $N_k = \text{Int}(n_{k\_T})$ and the rest as $N_{i \neq k} = \text{Int}(n_{i\_T}) + 1$. For the case frac_sum=0, all shader stages have $N_i = \text{Int}(n_{i\_T}) = n_{i\_T}$ and we have already found the best allocation $N_i = n_{i\_T}$. It can then be shown that the system reaches the maximum performance with this method. Similarly for two shader stages case (e.g. VS and PS) or more than three shader stages case (e.g. pre-tessellation VS, tessellation, post-tessellation VS, GS and PS, etc.), we have $$n_0 + n_1 + \ldots + n_{m-1} = N_{TOT} (8),$$

$$\frac{n_0 \times r_{0\_max}}{C_0} = \frac{n_1 \times r_{1\_max}}{C_1} = \ldots = \frac{n_{m-1} \times r_{m-1\_max}}{C_{m-1}}, \quad \text{Equation (9)}$$

and resolving (8) and (9) for $n_0, n_1, \ldots n_{m-1}$ we have the ideal target allocation of all shader stages that reaches the maximum performance $$n_{0\_T} = \frac{N_{TOT}}{1 + \frac{r_{0\_max}/C_0}{r_{1\_max}/C_1} + \frac{r_{0\_max}/C_0}{r_{2\_max}/C_2} + \ldots + \frac{r_{0\_max}/C_0}{r_{m-1\_max}/C_{m-1}}},$$

$$n_{1\_T} = \frac{N_{TOT}}{1 + \frac{r_{1\_max}/C_1}{r_{0\_max}/C_0} + \frac{r_{1\_max}/C_1}{r_{2\_max}/C_2} + \ldots + \frac{r_{1\_max}/C_1}{r_{m-1\_max}/C_{m-1}}}, \ldots$$

$$n_{m-1\_T} = \frac{N_{TOT}}{1 + \frac{r_{m-1\_max}/C_{m-1}}{r_{0\_max}/C_0} + \frac{r_{m-1\_max}/C_{m-1}}{r_{1\_max}/C_1} + \ldots + \frac{r_{m-1\_max}/C_{m-1}}{r_{m-2\_max}/C_{m-2}}}.$$

$\text{frac\_sum} = \text{Frac}(n_{0\_T}) + \text{Frac}(n_{1\_T}) + \ldots + \text{Frac}(n_{m-1\_T}) \leq m-1$. For the case frac_sum=m−1, only one shader stage has $N_i = \text{Int}(n_{i\_T})$ and the rest have $N_i = \text{Int}(n_{i\_T}) + 1$, we will select the shader stage that has largest $$H_k = \frac{\text{Int}(n_{k\_T}) \times r_{kmax}}{C_k} \left(\text{or largest } \frac{\text{Int}(n_{k\_T})}{n_{k\_T}}\right)$$

as $N_k = \text{Int}(n_{k\_T})$ and the rest of shader stages as $N_{i \neq k} = \text{Int}(n_{i\_T}) + 1$. For the case frac_sum=m−2, two shader stages have $N_i = \text{Int}(n_{i\_T})$ and the rest have $N_i = \text{Int}(n_{i\_T}) + 1$, we will select the shader stages that have $1^{st}$ and $2^{nd}$ largest $$H_k = \frac{\text{Int}(n_{k\_T}) \times r_{kmax}}{C_k} \left(\text{or } \frac{\text{Int}(n_{k\_T})}{n_{k\_T}}\right)$$

as $N_k = \text{Int}(n_{k\_T})$ and the rest of shader stages as $N_{i \neq k} = \text{Int}(n_{i\_T}) + 1$ and so on, . . . the scheme should work in a multi-core or multi-processor system with a pool of computation units that performs multiple stages of shading (or other programmable process), each stage executes one kernel or program and is part of a chain of such kernels, the outputs of a previous stage come to the next as inputs and so on. Although for the allocation scheme based on large granularity units e.g. EU-based scheduling, and especially when the total number of units is not large (e.g. 8~10 and like), we may use a trial-and-error method and limit the number of units to switch upon each adjustment to a small number say one unit (EU), this provides a reasonably good stepping function for convergence and it is easy for a scheduler to manage.

Consistent with the scope and spirit of the present invention, a variety of scheduling schemes may be utilized. Once such scheduling scheme may be a simple trial-and-error scheme. A more advanced scheduling scheme may be one with performance prediction. For the basic scheme, assume an initial allocation L0. As a first step, find where the bottleneck is (assume shader stage A). Then, select one shader stage that was least recently bottlenecked (say stage B) and switch one EU from stage B to stage A. This becomes allocation L1. Then, after time T, measure the final drain rate (or the total instruction throughput for L1). If L1 performance<=L0 performance, then repeat the reallocation to find another shader stage to switch. Basically, the load balancing can be viewed as finding an optimal or preferred allocation of EUs. If one EU is switched from another stage to join stage A, then a check is performed to see if the result is better than L0. If the result is not better, then the process continues until it cycles through all other stages. If all other stages are tested and we still don't find a better allocation, the load balancing ends with allocation L0. If a better allocation is found and a new bottleneck emerges (say stage A'), then stage A' becomes the preferred allocation"—then stage A' becomes a target stage that needs to have the bottleneck removed from. If, however, L1>L0, a better allocation a better solution has been found. If so, proceed to where the bottleneck is (say stage A').

Then, attempt to switch one EU from other stages to A', and compare with the m (m=number of shader stages) records of last known allocations. If it matches one of those records, then skip it until a new allocation is found based on a least-recently-bottlenecked rule. In one embodiment, an attempt is made to switch one EU from another stage to stage A', and the new allocation matches with one of the last known record, then the recorded throughput or drain rate info will be used to make a decision—if it's better than L0' in which case the embodiment will switch to that allocation. If, however, it is worse, then the embodiment keeps looking for other allocations. For making decision of switching is the same as what we described in the previous paragraph. A difference is that it is the pre-recorded performance info to make the decision rather than switching and then measuring the performance after the fact.

In the foregoing example, the process starts with the allocation L0. The number of EUs allocated to shader stage A, B, C, ... is $N\_A, N\_B, N\_C, \ldots$ (where N is an integer value) and stage A is determined to be the bottleneck. Say B is the least recently bottlenecked shader stage, then the process of this embodiment first switches one EU from B to A (A is the target stage). At that point, the allocation is L1, which is $N\_A+1, N\_B-1, N\_C, \ldots$ for shader stage A, B, C, etc. If the result is not better than L0, and the next least recently bottlenecked stage is C, then the process switches one EU from C to A instead (based on L0). At that point, the allocation (L2) then becomes $N\_A+1, N\_B, N\_C-1, \ldots$ Note, this is effectively the same as switching one EU from shader stage C to shader stage B (based on L1) and there is no need to go back to L0 before switching to L2. So all the trials can be done based on the current allocation with step function of switching one EU (or a group of uniform size of EUs or threads) at a time. Note, switching one EU or a group of uniform size of EUS or threads ensures that each allocation change takes one step and the process can return to the original allocation (L0) of each iteration in one step.

Further, when one new allocation is found better than L0, the current iteration with target shader stage A ends. The then bottleneck shader stage A' becomes the new target and the process repeats.

It should be appreciated that, in this approach, the embodiment can't simply jump directly to the best known allocation. Indeed, from the above explanation, the scheme guarantees that there is no "jump" between each change of allocation. Instead, the search and converge happens in the same process. Every time the process switches one EU from one stage to another, it measures the performance and compares the result with the preferred allocation of this round to decide whether to continue on or stop. The records of previous results help to prevent unnecessary switch.

For such a basic scheme, m records of last known allocations may be stored with their performance data (final drain rate or total instruction throughput). Also, the convergence process is restarted upon some change in the pipeline, i.e. shader program change, flow change caused by change of ratio of inputs/outputs of those shader stages, etc.

Consistent with the scope and spirit of the invention, rather than the above-described basic trail-and-error method, a more advanced scheduling scheme with predication may be implemented. Under this approach, projected (or predicted) performance is calculated based on some known factors (e.g., maximum drain rate or instruction throughput per EU for each shader stage) and from this it is determined whether or not to switch shader stages.

To further describe this high-level operation, consider an embodiment of a graphics processor having a pool of execution units comprising eight execution units. As an initial allocation, the first two execution units may be allocated to the vertex shader 320, while the next two execution units may be allocated to the geometry shader 330, while the last four execution units may be allocated to the pixel shader 340. As individual tasks are generated by the various shader units, those tasks are assigned to individual (available) threads within the assigned execution units (e.g., via the first-level scheduling). As tasks are completed, then threads assigned to those tasks are released (and again become available). Once an execution unit is allocated to a particular shader, the scheduler maintains that allocation, unless and until the scheduler 300 performs a reallocation of that execution unit to another shader. Embodiments of the present invention are directed to systems and methods for effectively performing such a dynamic reassignment or reallocation of execution units.

As mentioned above, the overall performance of a graphics processor is proportional to the amount of data that is processed through the graphics pipeline. As data is processed by a graphics processor in a pipelined fashion (e.g., vertex operations performed before rasterization, l rasterization performed before pixel shading operations, etc.), the overall performance of the graphics processor is limited by the slowest (or most congested) component in the pipeline. The scheduler of embodiments of the present invention, therefore, dynamically reassigns execution units in order to enhance the overall performance of the vertex shader, geometry shader, and pixel shader within the graphics pipeline. In accordance with this objective, as one of these units becomes bottlenecked, the scheduler 300 will reassign less busy execution units, currently assigned to one of the other shader units, to the shader unit that is presently congested. Through methodologies that will be described below, this reassignment may be performed in accordance with various strategies or embodiments in order reach an optimal allocation of the execution units for collectively processing data from the vertex shader, geometry shader, and pixel shader. Preferably, an allocation can be achieved such that none of the shader units is bottlenecked (indicating that one of the remaining fixed-function operations in the graphics pipeline is the bottleneck for the overall graphics processor, indicating that the allocation of the execution units is not resulting in an overall bottleneck to the graphics processor).

With regard to the dynamic scheduling and reassignment of execution units, in accordance with embodiments of the present invention, it is realized that the relative demand placed on the vertex shader 320, geometry shader 330, and pixel shader 340 will vary over time depending upon a number of factors including the relative size of the primitives in comparison to the pixel size, lighting conditions, texture conditions, etc. For primitives having a large pixel to primitive ratio, the operation of the pixel shader 340 will generally be much more resource consuming than the operation of the vertex shader 320. Likewise, for primitives having a small pixel to primitive ratio, the operation of the pixel shader 340 will be generally much less resource consuming than the operation of the vertex shader 320. Other factors may include the length of the programs for the vertex shader, geometry shader, and pixel shader (as the units are programmable), and the type of instructions being executed, etc.).

Before discussing specific implementations, it should be understood that a variety of strategies for dynamically reassigning the various execution units may be performed in accordance with embodiments of the invention. For example, in accordance with one embodiment, a trial-and-error method may be employed. In such an embodiment, if a given shader unit is identified as bottlenecked, the system and method may measure and record the overall performance of the pipeline (or at least the three shader stages). Various methods for measuring or assessing such overall performance will be described herein.

After recording a current level of performance, the scheduler 300 may reassign an execution unit currently assigned to one of the two non-bottlenecked shader units to the currently-bottlenecked shader unit. After the reassignment is effective, the system or method may take a subsequent measurement of the overall performance level to assess whether the reallocation improved or degraded the overall performance. If it is found that the overall performance is degraded, then the scheduler may undo the assignment (and optionally reassign an execution unit from the remaining non-bottlenecked execution unit). With appropriate measures taken to assure that assignment configurations are not repeated or that too much resources or time is not spent in performing the administrative task of changing execution unit assignments, it would be appreciated that such a trial-and-error method may be implemented to effectively reach an optimal allocation of execution units with the various shader stages.

In alternative embodiments, the scheduler 300 may be configured to estimate a potential performance gain or loss that would result in a projected reassignment of execution units. In such an embodiment, rather than actually performing a reassignment and then measuring actual performance gains or losses, a performance projection or estimate may be employed. Such projection estimates may be made by considering a variety of factors, such as available resources (e.g., memory space, threads, available registers, etc.) of the various execution units. In one embodiment, the projection estimate is made based on instruction throughput prediction and current bottleneck shader stage, and the bottleneck shader stage is determined by the utilization of common register file memory and thread usage. Where such projections or estimates deem a reallocation to result in a positive performance improvement, then the reallocation may be performed. It should be appreciated that, in most such embodiments, the projected or estimated performance change will have some inherent accuracy shortcomings. However, it may be realized that deficiencies resulting in inaccurate estimates are less than the overhead required to perform reassignments, making such embodiments viable options in certain situations.

It should be appreciated that, in certain embodiments, there are two different scheduling configurations in the $2^{nd}$ level scheduler, which is configured by a scheduling control register. One is a static scheduling configuration, in which the driver programs the EU allocation statically. The driver may decide how EUs should be assigned based on some statistical data from hardware performance counters collected during the previous frames or draw batches. A second is a dynamic scheduling configuration, in which the hardware makes EU assignment dynamically. In dynamic scheduling configuration, the driver may still provide the initial assignment (otherwise, if none is specified, the hardware will choose the hardware default assignment and start from there), and send commands to notify the hardware to re-evaluate the assignment under certain circumstances, or force an assignment and change back to static configuration.

It should be further realized that the initial assignment of execution units to the various shader units is an operation that is performed periodically. In this regard, as the graphics processor undergoes state changes, then the various shader units may be completely reassigned anew, to perform operations in the new graphics state. For example, a change of shading characteristics on different rending objects with different shading characteristics, lighting conditions may change, a new object in a graphics scene may be rendered, as well as a variety of other events may occur that lead to a change in the state of the graphics processor, such that the processing essentially begins anew. There are various ways and mechanisms for identifying such a state change, including signals generated by the software driver, which may be used to signal such a wholesale reassignment of the execution units to the scheduler.

Reference is now made to FIG. 6, which is a block diagram illustrating certain components within the scheduler 300. First, the scheduler 300 includes logic capable of making an initial assignment of execution units to the various shader units, based on a predetermined ratio. This predetermined ratio may be fixed in the graphics processor, or alternatively may be signaled to the graphics processor by the software driver.

Again, in certain embodiments, there are two configurations, and in the static mode, the software driver controls the EU assignment. In the dynamic mode, the hardware may make the decision on its own based upon the real-time congestion status. The software driver may make the decision based on some statistical data from hardware performance counters collected during the previous frames or draw batches. The scheduler 300 further includes logic 360 configured to make dynamic reallocations of the execution units based on real-time performance parameters or the measured performance of the individual shader units. As mentioned previously, if none of the shader units are currently bottlenecked, then there is no present need to perform a reassignment of execution units, as doing so would not result in an increase in overall performance of the graphics processor. Therefore, the scheduler includes logic 362 configured to determine if and where bottlenecks exist in any of the shader units. On way is to check or determine the fullness of the EUs assigned to each shader stage. There are various ways that such bottlenecks may be identified. On way is to identify a condition, such as a condition that all threads are busy or a condition that all storage is occupied. As mentioned above, in one embodiment, each execution unit is configured to have thirty-two internal threads for execution. If the scheduler 300 determines that all threads (or substantially all threads) associated with the execution units assigned to a given shader are currently busy, then that particular shader unit may be identified as full. When all EUs belonging to one shader stage are full, then the shader stage is considered full. When the one shader stage is full and the next pipeline stage is not full then the shader stage is consider being bottleneck. Similarly, other resources may be evaluated to assess whether a given shader unit is full. For example, each execution unit may have a predetermined amount of allocated memory or register space. After a certain predetermined amount of the memory or register space is utilized or consumed, the scheduler 300 may identify that particular execution unit as being full.

Note, in one embodiment, the congestion of a shader stage is determined by the fullness of the EU allocated in the shader stage and the status of the next pipeline stage. If all EUs allocated in the shader stage are full and the next pipeline stage (either another shader stage or a fixed-function block) is not full, the shader stage is considered to be bottlenecked.

The scheduler 300 further includes logic 364 for reassigning execution units to a different shader. As should be appreciated, such a reassignment would include the execution of steps necessary to stop assigning any new tasks that belong to previous shader stage assigned to the EU and start draining the EU for the existing tasks/threads. Since the EU hardware support two shader contexts, it allows the tasks that belong to the new shader stage assigned to the EU to start coming in before the previous shader context ends. (This is for preventing pipeline stall due to shader stage change). For example, assume that execution unit 1 302 and execution unit 2 304 are presently assigned to the vertex shader 320. Assume further that the pixel shader 340 is determined by the scheduler 300 to be in a bottlenecked condition, and further that the scheduler 300 seeks to reassign execution unit 2 304 to the pixel shader 340. Before sending tasks from the pixel shader 340 to the newly assigned execution unit 304. Alternatively, the scheduler 300 may just stop sending new tasks in to execution unit 304, and once all tasks currently being carried out in execution unit 304 have completed, then execution unit 304 may be reassigned to pixel shader 340, and new tasks (mentioned earlier) can start being assigned.

In one embodiment, the scheduler 300 further includes logic 366 for determining a least busy, non-bottlenecked execution unit. In an embodiment utilizing this logic 366, the scheduler 300 may utilize or select the least busy of the remaining execution units (execution units not assigned to the bottlenecked shader unit). This determination may be made in any of a variety of ways, including evaluating the available resources (e.g., threads, memory, register space) of the individual execution units, evaluating the number of tasks currently assigned to the individual execution units, etc. In one embodiment, the determination is made using a least recently bottlenecked shader stage (as previously described).

Finally, the scheduler 300 includes logic 368 for comparing or measuring performance of various execution units. As described above, certain embodiments of the invention utilize a scheduler 300 that performs a trial-and-error reassignment of various execution units. Prior to, and subsequent to, such reassignments, the scheduler measures performance of the execution units, and particularly execution units grouped to the various shader units to assess overall performance both before and after the reassignment. In addition to evaluating the execution units on an individual basis, overall performance may also be assessed in other ways. For example, the output of the pixel shader (sometimes referred to as drain rate) may be evaluated to determine or measure the number of pixels having completed processing operations (i.e., pixels ready for communication to a frame buffer for display). Alternatively, the outputs of each of the individual shader units may also be evaluated to assess overall performance, particularly in situations where one or more of the shader units may be disabled or bypassed.

Reference is now made to FIGS. 7A-7D, which collectively comprise a flow chart illustrating the top-level operation of an embodiment of the present invention. In a first step 402, the scheduler assigns execution units to the various shader units in accordance with a predetermined ratio. For example, in a configuration having eight execution units, two may be assigned to the vertex shader, two may be assigned to the geometry shader, and the remaining four may be initially assigned to the pixel shader. Thereafter, the execution units may be permitted to process incoming requests or tasks for a certain period of time (step 404). Thereafter, the scheduler may check to determine whether any shader unit is bottlenecked. If not, the system may be allowed to resume processing for another predetermined time before making a similar comparison (step 406). If the scheduler determines that one of the shader stages is, in fact, bottlenecked, then the system measures and records the current performance with the present allocation or assignment of execution units (step 408). Thereafter, the steps taken depend on which shader unit is deemed to be bottlenecked. If it is determined (step 410) that the vertex shader is bottlenecked then an embodiment of the invention chooses to reallocate or reassign an available execution unit from either the geometry shader or the pixel shader to the bottlenecked vertex shader. As illustrated in step 412 (FIG. 7B), one embodiment of the invention selects from the least recently bottlenecked of the other shader stages. That is, if a previous bottleneck was found and an execution unit of the geometry shader was reassigned, then as between the geometry shader or the pixel shader step 412 would select an execution unit from the pixel shader (if the geometry shader was more recently bottlenecked).

Figure 7A:
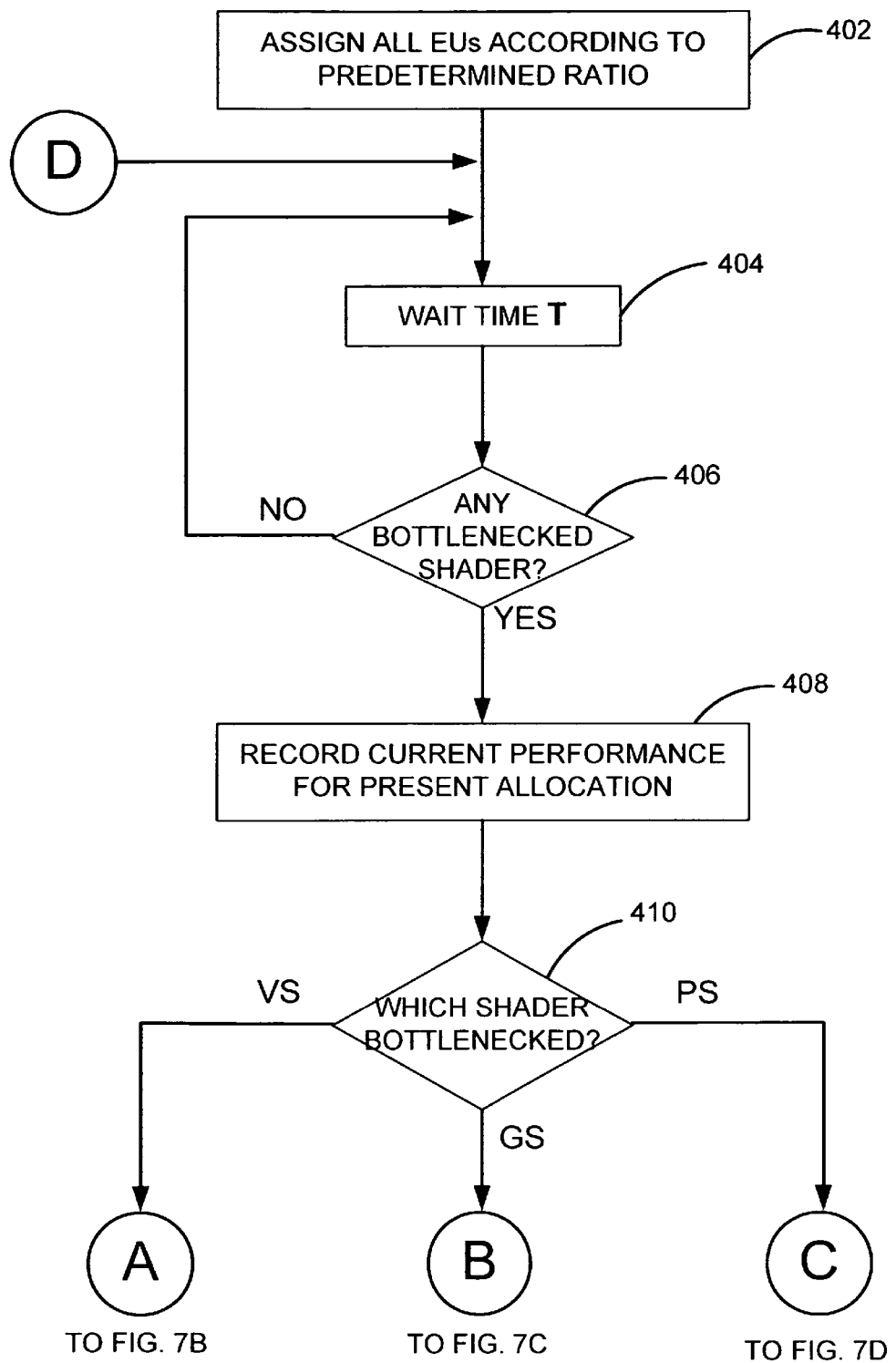
FIGS. 7A, 7B, 7C, and 7D collectively comprise a flow chart illustrating the top-level operation of other embodiments of the invention.
Figure 7B:
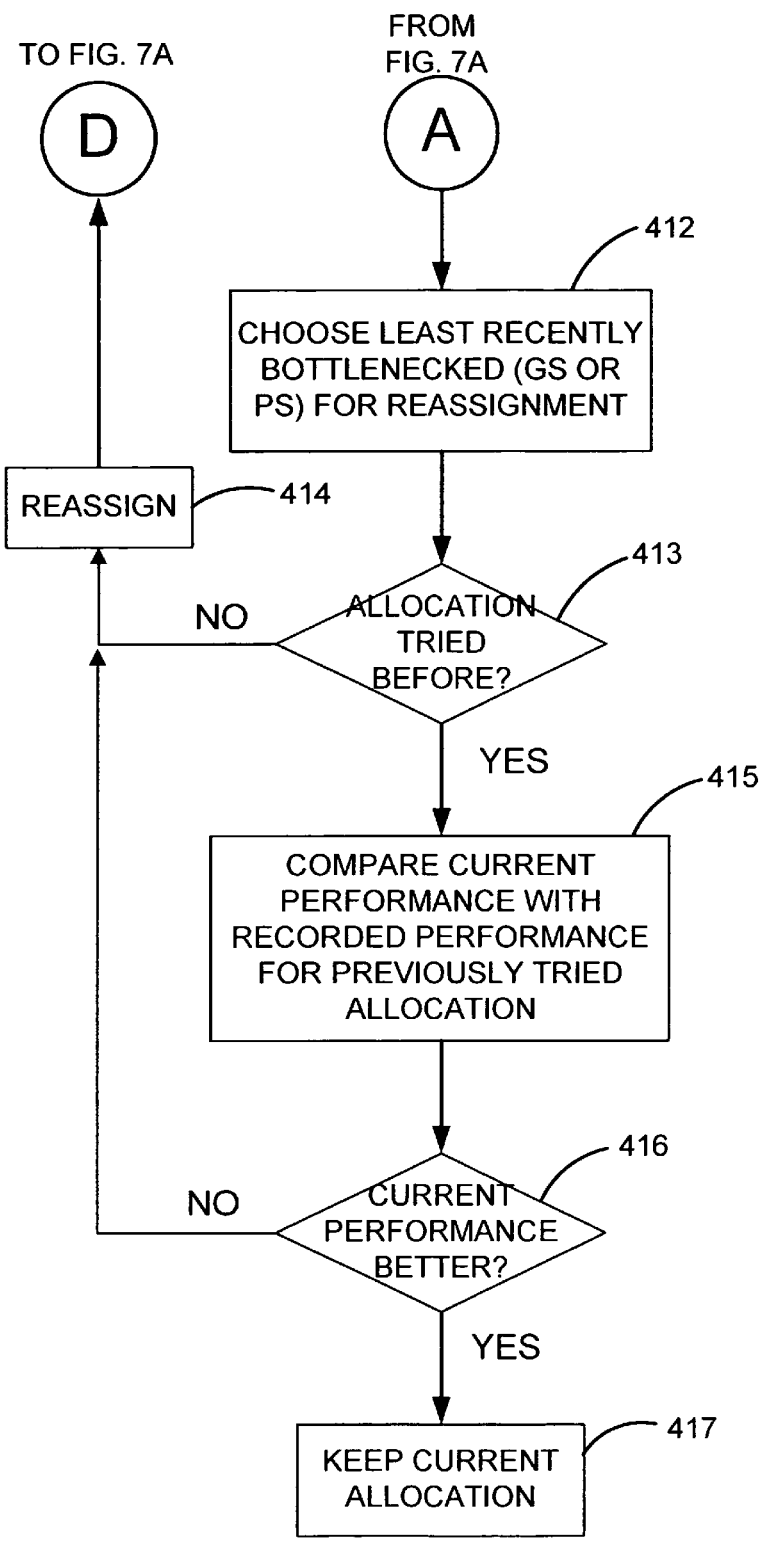

In keeping with the description of FIG. 7B, the scheduler assesses whether the proposed allocation or assignment would result in an allocation that had been previously tried (step 413). As previously described, one embodiment of the present invention performs a trial and error method of dynamic reallocation of execution units among the various shader blocks. If step 413 determines that an allocation or a proposed allocation had not been previously tried then it proceeds to step 414, where it performs an appropriate reassignment of an execution unit from either the geometry shader or pixel shader into the vertex shader. If, on the other hand, step 413 determines that the proposed allocation has been tried before, then the scheduler measures and compares a current performance with the performance previously recorded for the proposed allocation (step 415). If the current performance is better than the performance that was realized when the proposed allocation was previously in effect (step 416), then the current allocation or assignment of execution units from either the geometry shader or pixel shader is maintained (step 417). If, however, the previous allocation resulted in better performance than the current performance, then the scheduler proceeds to perform the reassignment of execution units (step 414). It should be appreciated that the methodology illustrated in FIGS. 7A and 7B (with respect to a reassignment for a bottlenecked vertex shader stage) is configured such that if the vertex shader remains bottlenecked the system will not toggle back and forth between various reassignments of execution units, thereby burning resources by merely thrashing amongst various operating configurations.

Figure 7C:
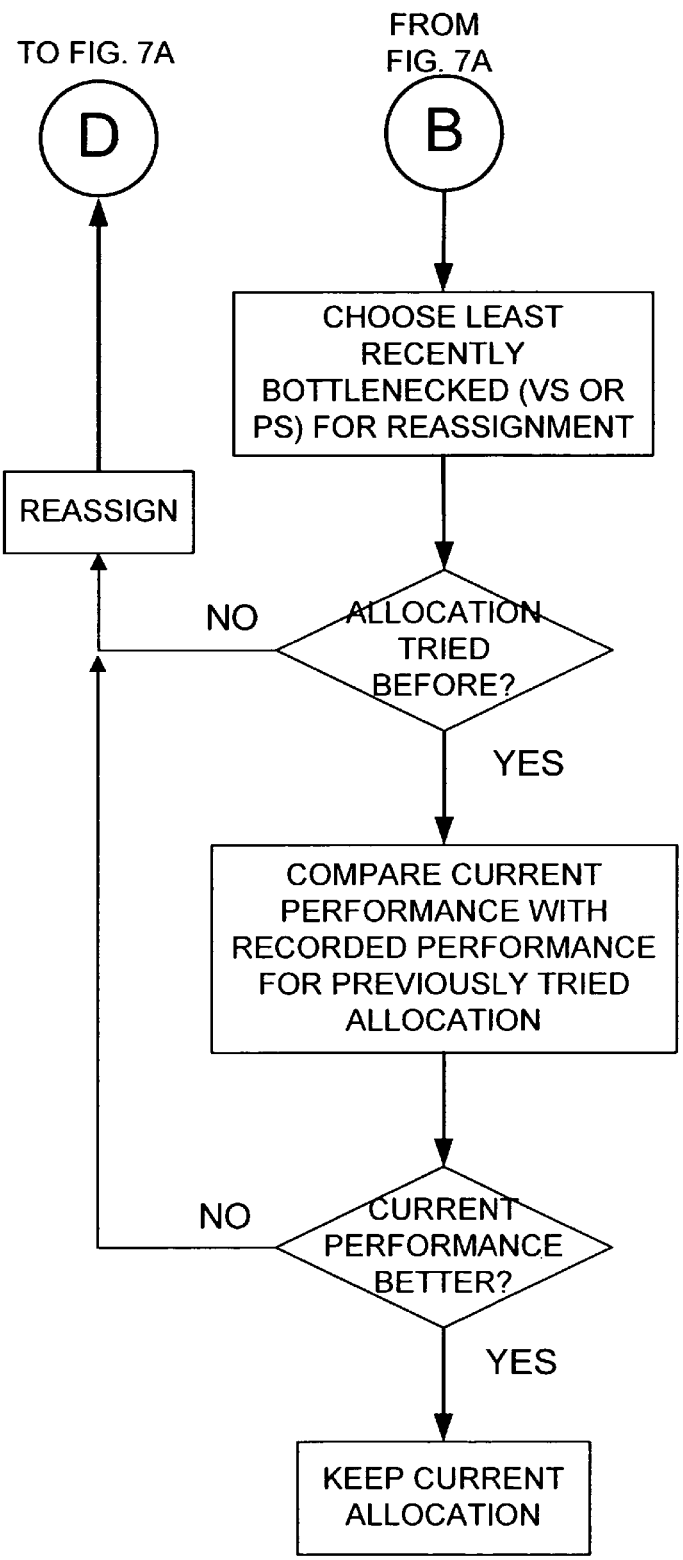
Figure 7D:
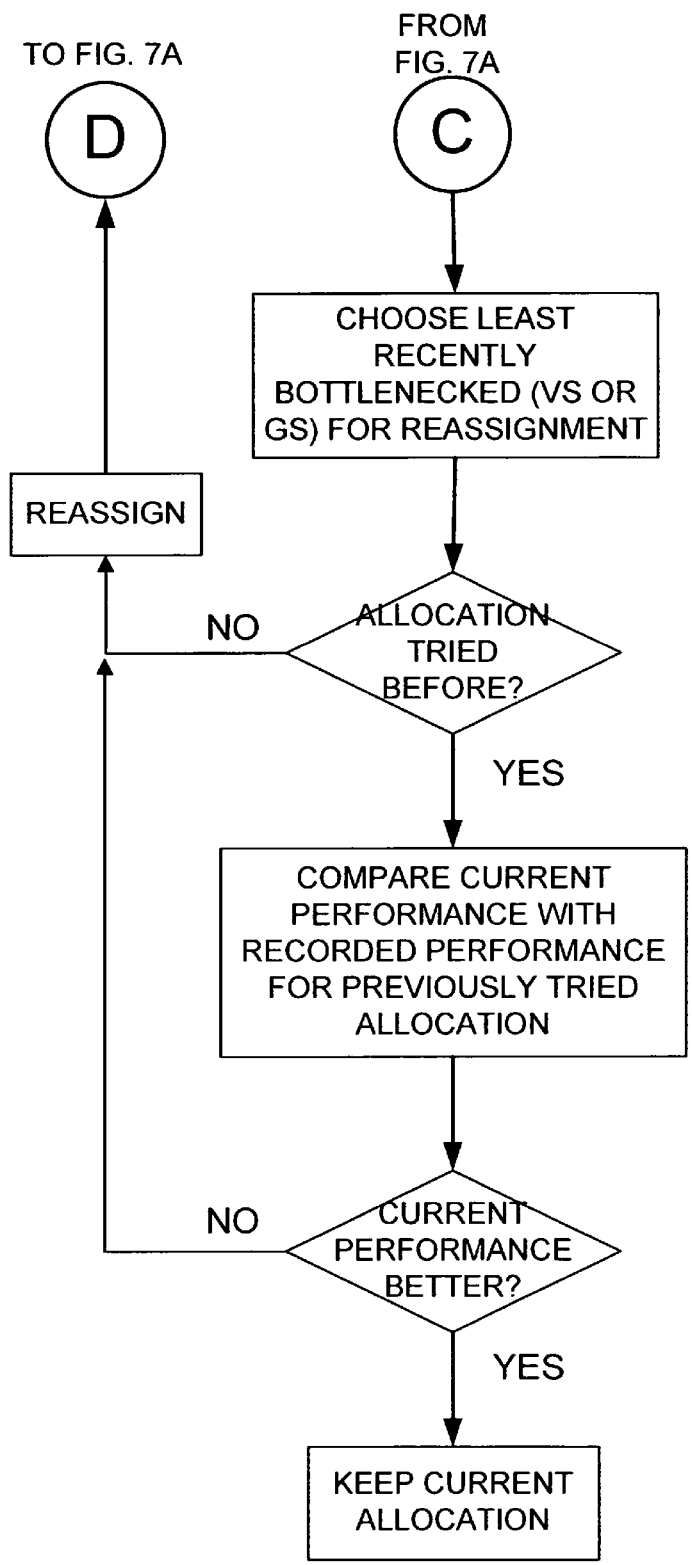

Returning to step 410 of FIG. 7A, it is seen that if the geometry shader or pixel shader are determined to be bottlenecked, then the flow proceeds to FIGS. 7C and 7D, respectively. The operation illustrated in each of these figures is similar to the operation illustrated in FIG. 7B, with respect to a bottlenecked vertex shader. Therefore, an understanding of the operation of those scenarios is understood by reference to the description of FIG. 7B.

Figure 8A:
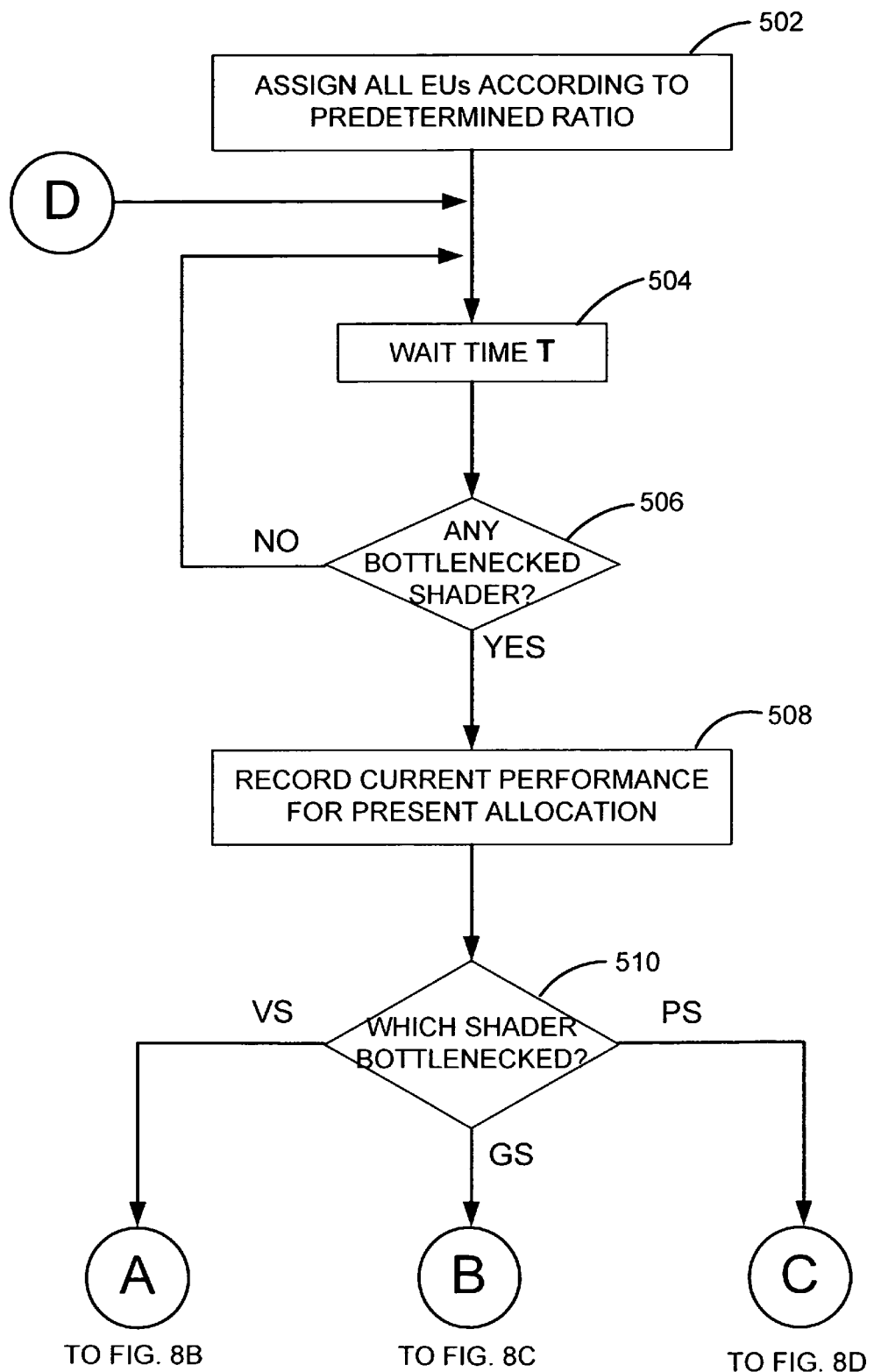
FIGS. 8A, 8B, 8C, and 8D collectively comprise a flow chart illustrating the top-level operation of other embodiments of the invention.
Figure 8B:
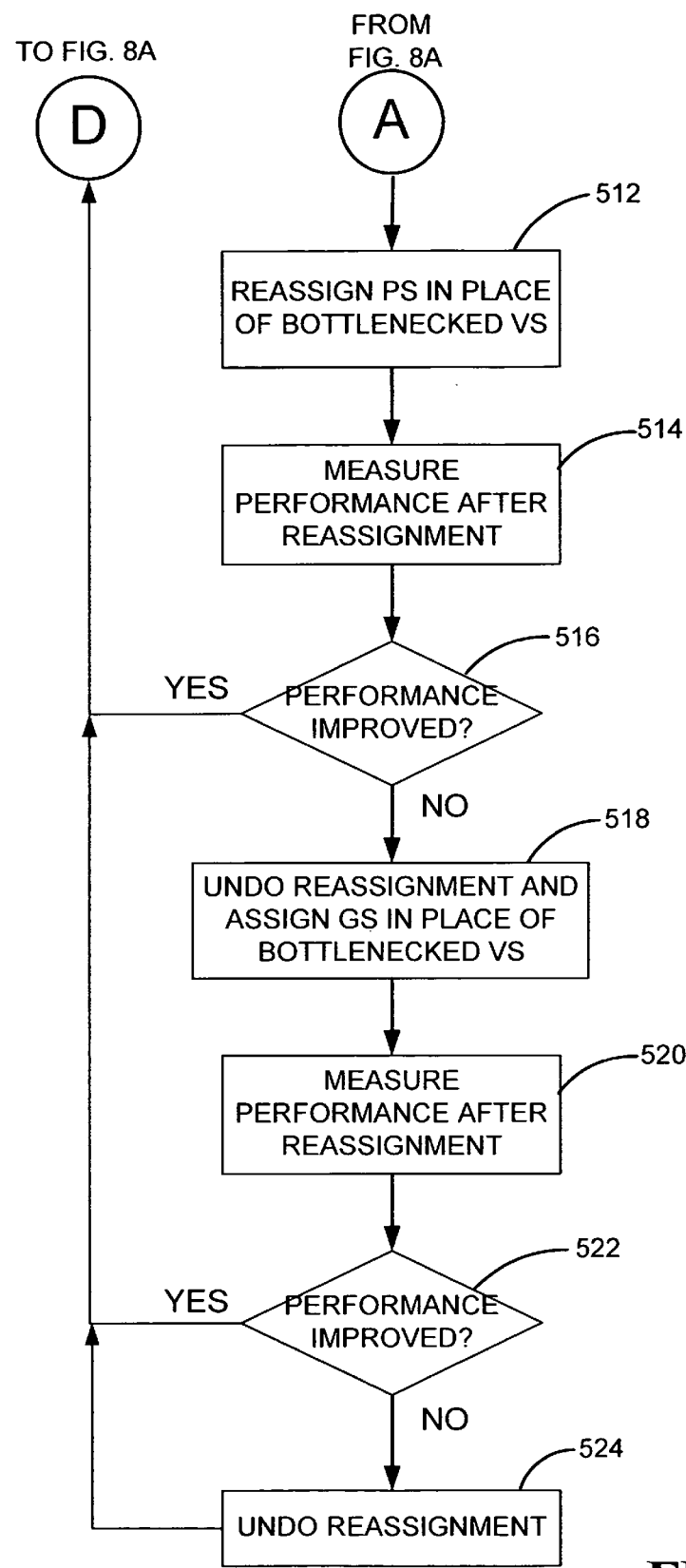
Figure 8C:
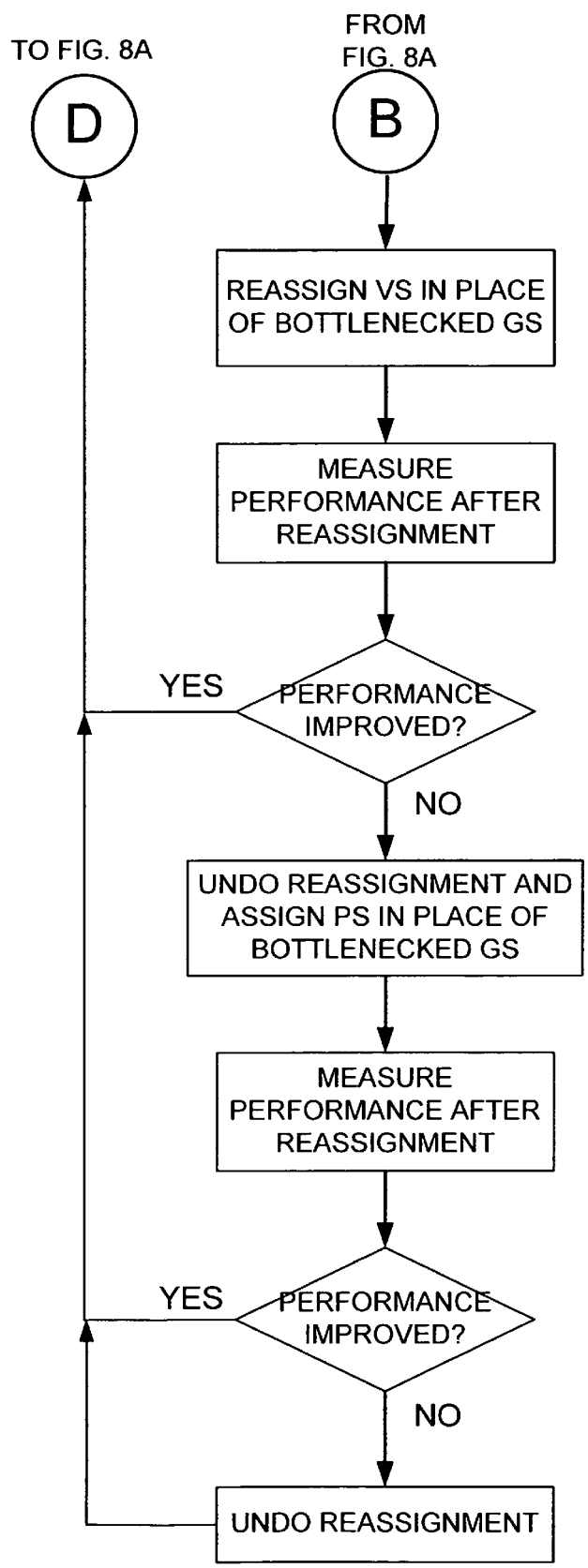
Figure 8D:
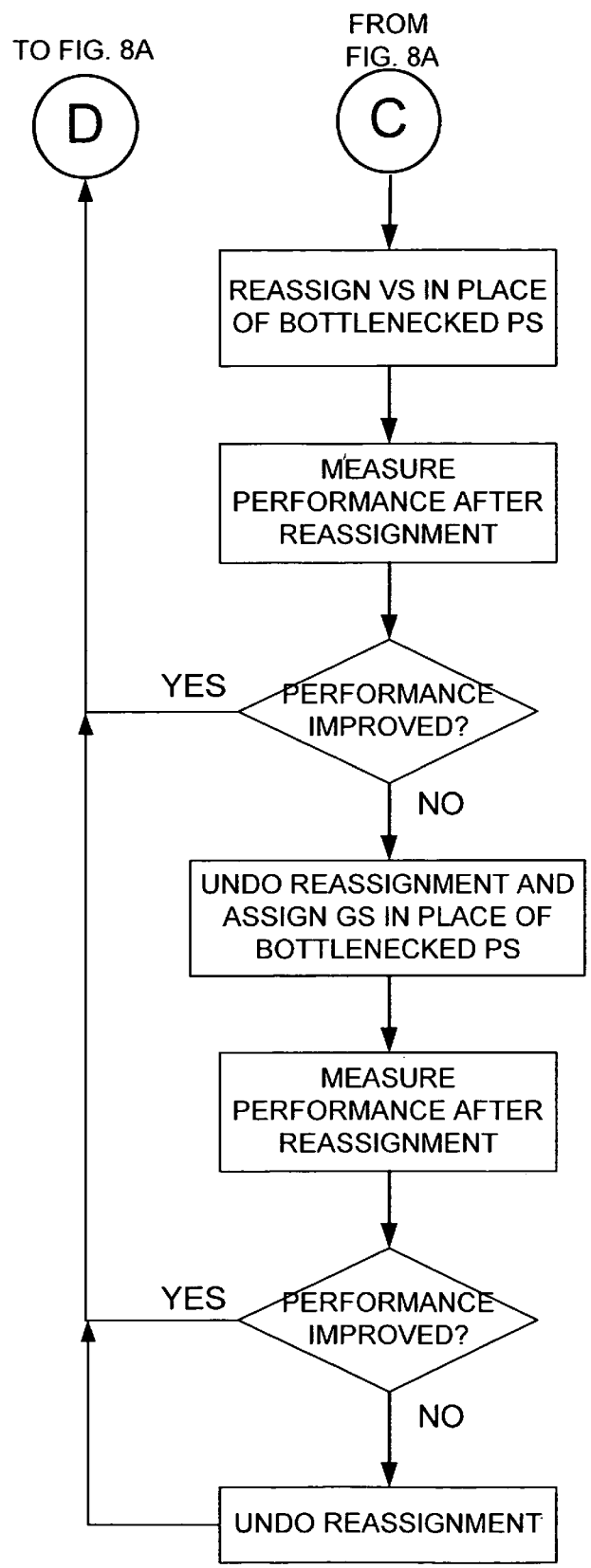

Reference is now made to FIGS. 8A through 8D collectively, which comprise a flow chart illustrating a high-level operation of another embodiment of the present invention. Like the embodiment illustrated in FIGS. 7A-7D, the scheduler performs an initial assignment of all execution units to the various shader units, in accordance with a predetermined ratio (step 502). Thereafter, the system processes shader tasks in accordance with this ratio for a predetermined time (step 504). Thereafter, a check is made to determine whether any shader unit is bottlenecked (step 506). If so, the current performance is measured and recorded under the present allocation (step 508). Thereafter, the system proceeds based upon which particular shader unit was determined to be bottlenecked (step 510). If, for example, the vertex shader is determined to be bottlenecked, then the system proceeds by reassigning an execution unit currently assigned to the pixel shader to the currently-bottlenecked vertex shader (step 512). Thereafter, the system measures the performance (after the reassignment) 514 and determines (step 516) whether the performance has improved. If the performance is determined not to have improved, then the system undoes the reassignment (step 518) and instead assigns an execution unit currently assigned to the geometry shader in place of the bottlenecked vertex shader. Again, the system measures the performance after the reassignment (step 520) and determines whether the performance has improved (step 522). If not, the reassignment is again undone (step 524). FIGS. 8C and 8D illustrate similar steps that are taken if the bottleneck is determined to be with the geometry shader or pixel shader, respectively.

Figure 9:
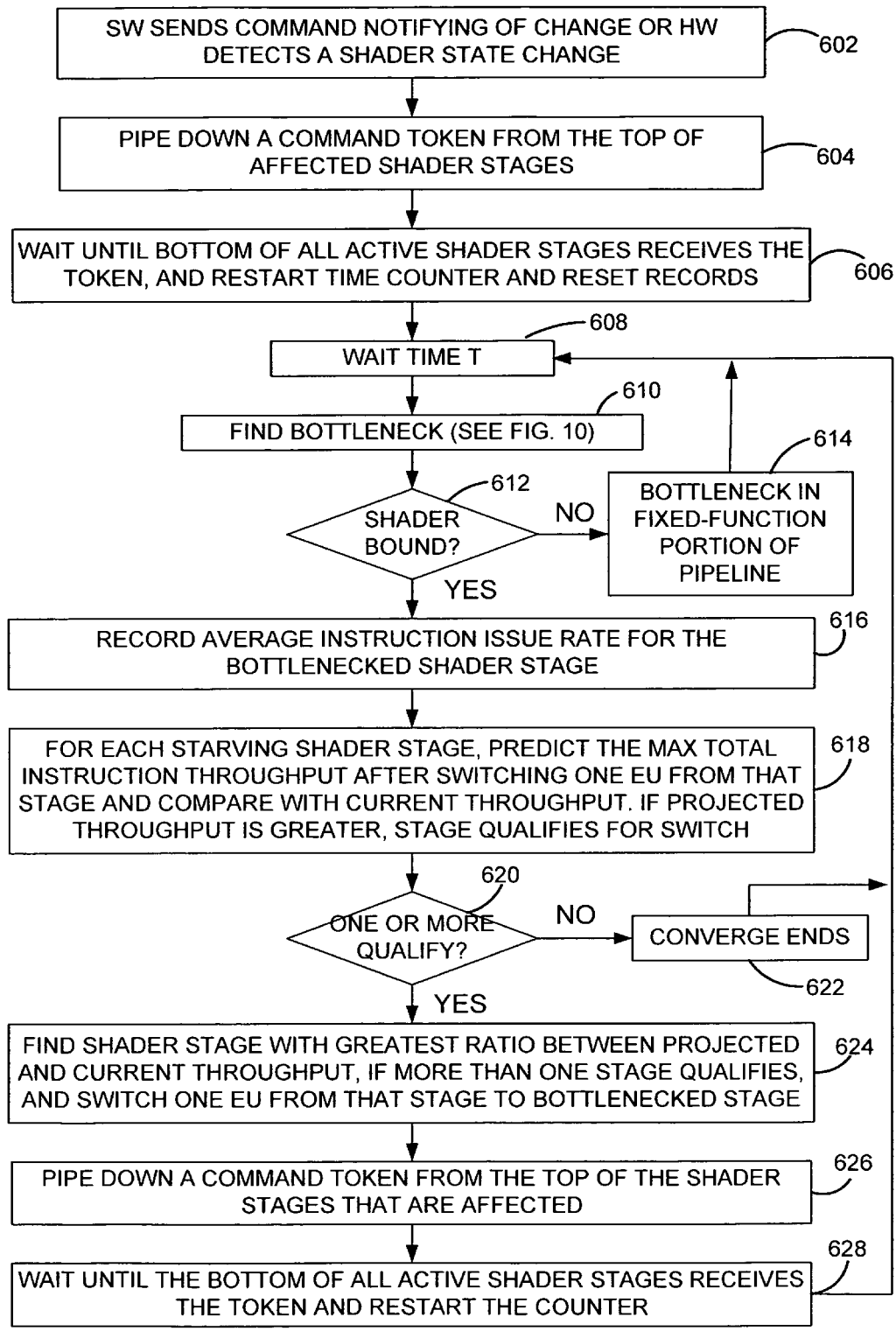
FIG. 9 is a flow chart illustrating a top-level functional operation of another embodiment of the present invention

Reference is now made to FIG. 9, which is a flowchart illustrating certain top-level operations of an embodiment of the invention. As previously mentioned, a change of state, or other event, may lead to a reset or a restart condition within the graphics pipeline. Such an event may be triggered or signaled by software, or may be detected by dedicated hardware (step 602). In one embodiment, after such a state change is signified or detected, the system pipes down a command token from the top of each shader stage that is affected by the state change (step 604). Thereafter, the system waits until the bottommost of all active shader stages receives the token, and at that time, the system resets certain records and restarts certain timer counters (step 606). Thereafter, the system waits for a time T (step 608). During this time, the system begins processing graphics in the new graphics state, and begins dynamically assigning and managing the various shader stages, as broadly described in the embodiments above.

Figure 10:
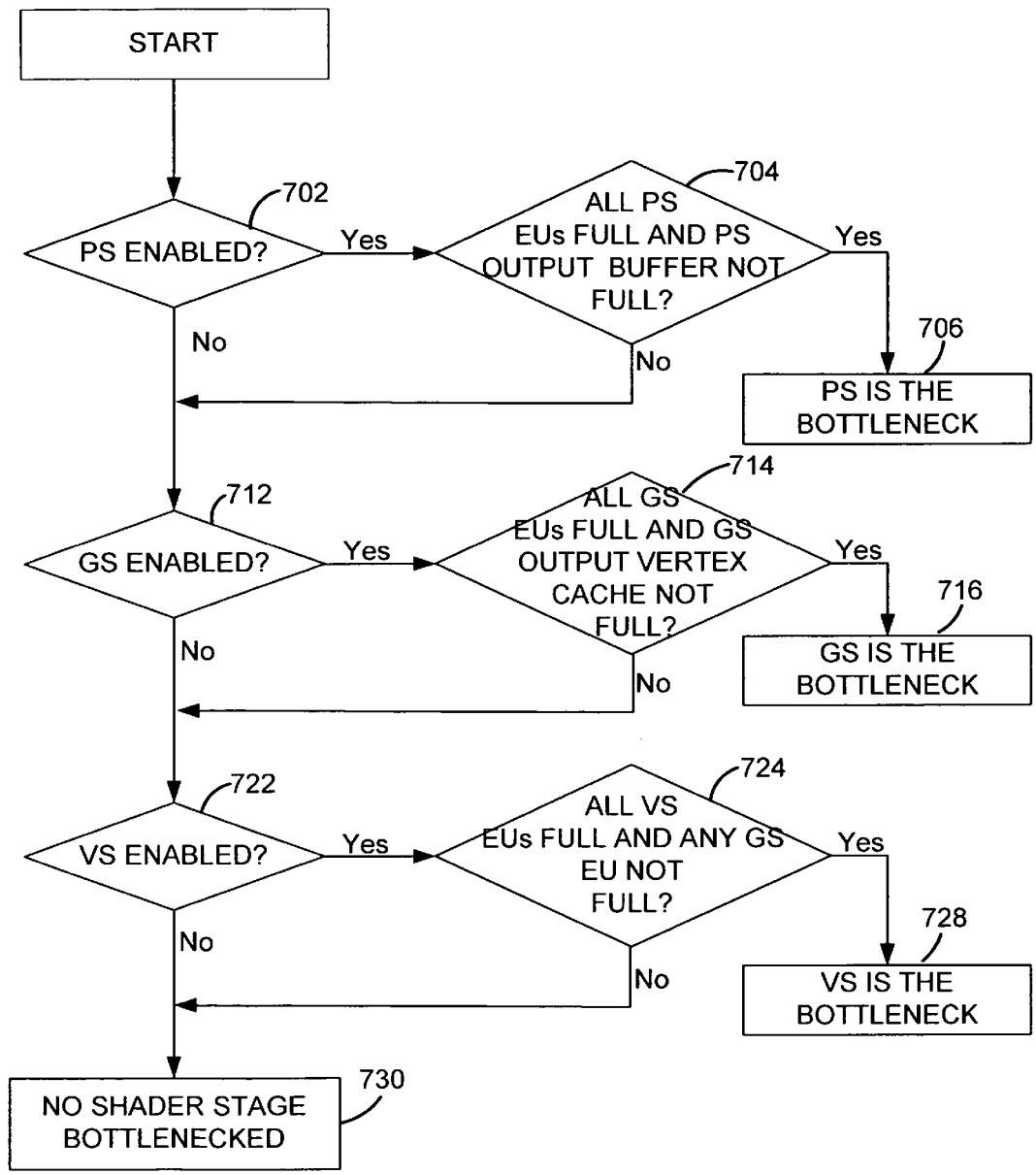
FIG. 10 is a flow chart illustrating a top-level functional operation of a method for determining which, if any, shader stage is bottlenecked.

In the embodiment of FIG. 9, the system detects or determines (at step 610) whether any of the shader units or shader stages are bottlenecked. This determination may be made in a variety of ways, and one method is illustrated in FIG. 10 (which will be discussed below). If no shader stage is bound (see step 612), then the bottleneck of the graphics pipeline is in some other, fixed-function portion of the pipeline (see step 614). If, however, a shader stage is determined to be bound (or bottlenecked), then the system records an average instruction issue rate for the bottlenecked shader stage (step 616). That is, the system measures and records an average number of instructions being executed per unit time. With respect to the non-bottlenecked shader stages (also referred to as starving shader stages—as they have available resources for processing), the system estimates or predicts the maximum total instruction throughput after switching one execution unit from that stage to the bottlenecked stage, and compares that prediction with the current, measured throughput. If the projected throughput is greater than the current, measured throughput, then that stage qualifies for a switch of one of its execution units to the bottlenecked shader stage (step 618). The system determines (step 620) whether one or more execution units or shader stages qualifies for such a switch. If not, the convergence ends 622. If, however, one or more execution units or shader stages qualifies for such a switch, then the system finds a shader stage with a greatest ratio between projected and current throughput and switches one execution unit from that stage to the bottlenecked stage (step 624). Thereafter, the system pipes down a command token from the top of the shader stages that are affected by the switch (step 626), and waits until the bottom of all active shader stages receives the token and again restarts appropriate counters and resets appropriate records (step 628).

Reference is now made to FIG. 10, which is a flowchart illustrating certain top-level operations of a process for determining which, if any, shader stages are currently bottlenecked. As previously described herein, and as will be appreciated by persons skilled in the art, at any given time or for certain graphics operations, one or more of the various shader stages may be disabled. Therefore, the method of FIG. 10 determines (step 702) whether the pixel shader is enabled. If so, the method then determines whether all execution units of the pixel shader are full and whether an output buffer of the pixel shader is not full. With regard to the determination whether all pixel shader execution units are full, the system may look to the resources of the execution units, such as whether all threads are presently busy, whether all register space of the execution units are full, whether the memory resources of the execution units are full, etc. Thus, different or varying ones of these factors may be utilized, consistent with embodiments of the invention, to make this determination (step 704). If all these resources are full, and the output buffer is not full, then this indicates that the pixel shader is the bottleneck (step 706). In this regard, the output buffer has capacity to receive more output from the pixel shader, but the pixel shader is not generating enough output, and there are no further resources available within the pixel shader to generate additional output.

Likewise, the method determines whether the geometry shader is enabled (step 712). If so, the method determines whether all geometry shader execution units are full and whether the geometry shader output vertex cache is not full (step 714). If this condition is met, then the system determines that the geometry shader is the bottleneck (step 716).

Similarly, the method determines (at step 722) whether the vertex shader is enabled. If so, the method determines whether all vertex shader execution units are full and whether any geometry shader execution unit is not full (step 724). As the geometry shader is downstream (within the pipeline) of the vertex shader, execution capacity within the geometry shader execution units certainly indicates that the geometry shader is not the bottleneck, and has capacity to receive additional data or output from the vertex shader. If, however, all of the execution units of the vertex shader are full, this is an indication that the vertex shader is the bottleneck (step 728), as the vertex shader is not capable of processing information fast enough to pass to the available resources of the geometry shader.

If the various decision blocks of FIG. 10 allow the flow to reach step 730, then it is determined that no shader stage is bottlenecked. In essence, this stage is reached if all enabled shader stages have available processing resources or, for any shader stage that does not have available resources, the output or next downstream unit from that shader stage has available processing capacity.

Figure 11:
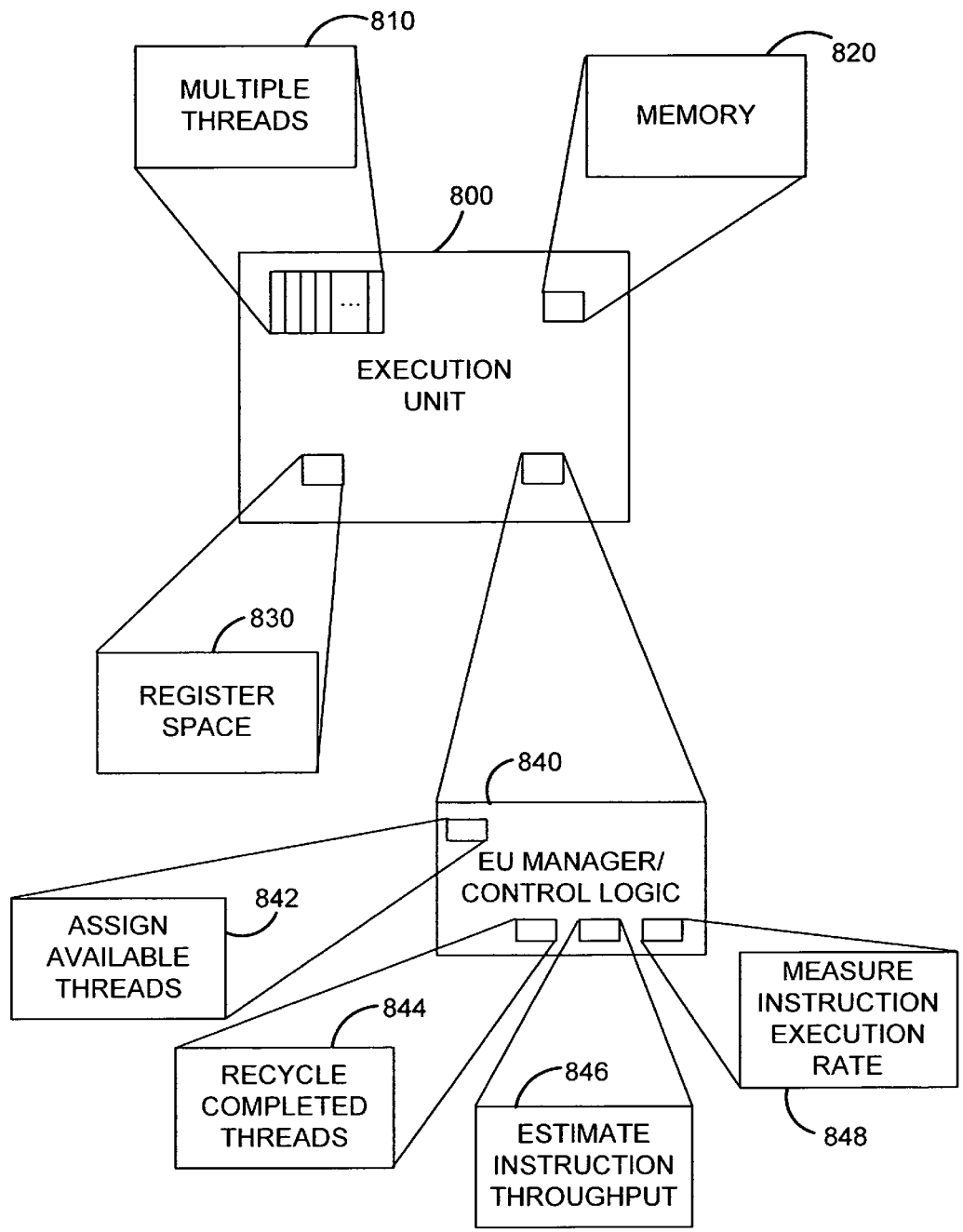
FIG. 11 is a block diagram illustrating certain components within an execution unit of an embodiment of the invention.

Reference is now made to FIG. 11, which is a block diagram illustrating certain units or logic within an execution unit 800 of an embodiment of the invention. As described above, each execution unit 800 includes the requisite logic or circuitry 810 for executing a plurality of independent threads. In one embodiment, each execution unit 800 has the requisite logic and circuitry for executing 32 independent, parallel threads. Other embodiments may support additional or fewer threads. Each execution unit 800 further includes memory resources 820, as well as register space 830. In addition, each execution unit 800 includes control logic or an execution unit manager 840. The execution unit manager 840 is designed to manage and control various operation of the execution unit, from carrying out various functions and features described herein. For example, the execution manager 840 includes logic 842 configured to assign available threads for carrying out tasks that are assigned to the execution unit. This assignment of threads includes the association or assignment of various resources (including memory and registers) for supporting the operation of the thread. Likewise, the execution unit manager 840 includes logic 844 to recycle threads for subsequent tasks, once the assigned task is completed. Further still, logic 846 is provided for estimating instruction throughput, as was briefly described in connection with step 618 of FIG. 9. Likewise, logic 848 is provided for measuring the actual instruction execution rate, as described in step 616 of FIG. 9.

As will be appreciated by persons skilled in the art, additional components may also be included within an execution unit for carrying out various tasks and operations, consistent with the description of the embodiments provided herein.

It should be appreciated that the flow charts illustrated in connection with FIGS. 7 and 8 have been simplified for purposes of illustrating certain operations of the embodiments. Certainly, additional steps and evaluations may be included in the various embodiments, which have not been specifically illustrated herein.

In summary, what has been described herein is a novel system and method for performing effective load balancing of a pool of execution units among several shader stages in a graphics pipeline. In embodiments described above a two-level scheduling is performed, whereby a first level scheduling is performed at the thread level (e.g., assigning certain threads within a given execution unit to perform certain tasks) and a second level scheduling is performed on an execution unit level (e.g., assigning certain execution units to certain shader stages). Embodiments have also been described wherein the second level scheduling can be static (e.g., controlled by the software driver) or dynamic (e.g., controlled in real time by graphics hardware). Further still, embodiments have been described which detail various methodologies for performing the dynamic scheduling. One methodology implements what was described as a load balancing scheduling (scheduled based on a workload balancing). Another methodology described the scheduling/allocation based on a calculation of instruction throughput (or drain rate). Yet another embodiment described a trial and error method of scheduling and assigning execution units to the various shader stages. It will be appreciated, however, that additional embodiments (not specifically described herein) may be implemented consistent with the scope and spirit of the present invention.

As used herein, the term "logic" is defined to mean dedicated hardware (i.e., electronic or semiconductor circuitry), as well as general purpose hardware that is programmed through software to carry out certain dedicated or defined functions or operations.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Figure 12:
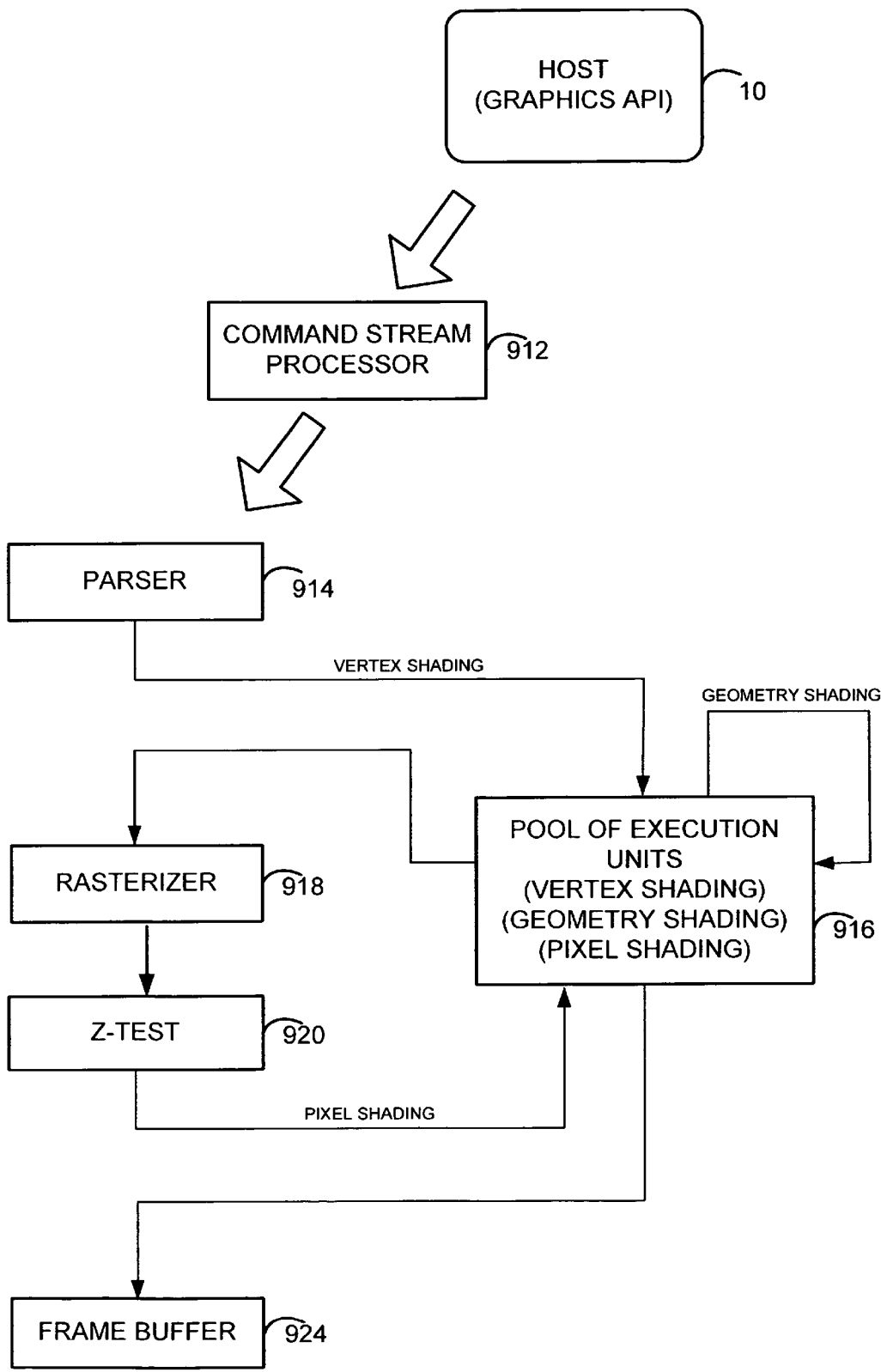
FIGS. 12 and 13 illustrate higher-level features of embodiments of the invention.

Having described certain detailed embodiments, reference is made to FIG. 12, which illustrates a high-level block diagram in accordance with embodiments of the invention. FIG. 12 is a diagram similar to the prior art diagram of FIG. 1, and a comparison of the two diagrams illustrates certain advancements of the present invention. In short, a single hardware element 916 comprising the shared pool of execution units is provided to handle the separate computations of vertex shading, geometry shading, and pixel shading.

Figure 13:
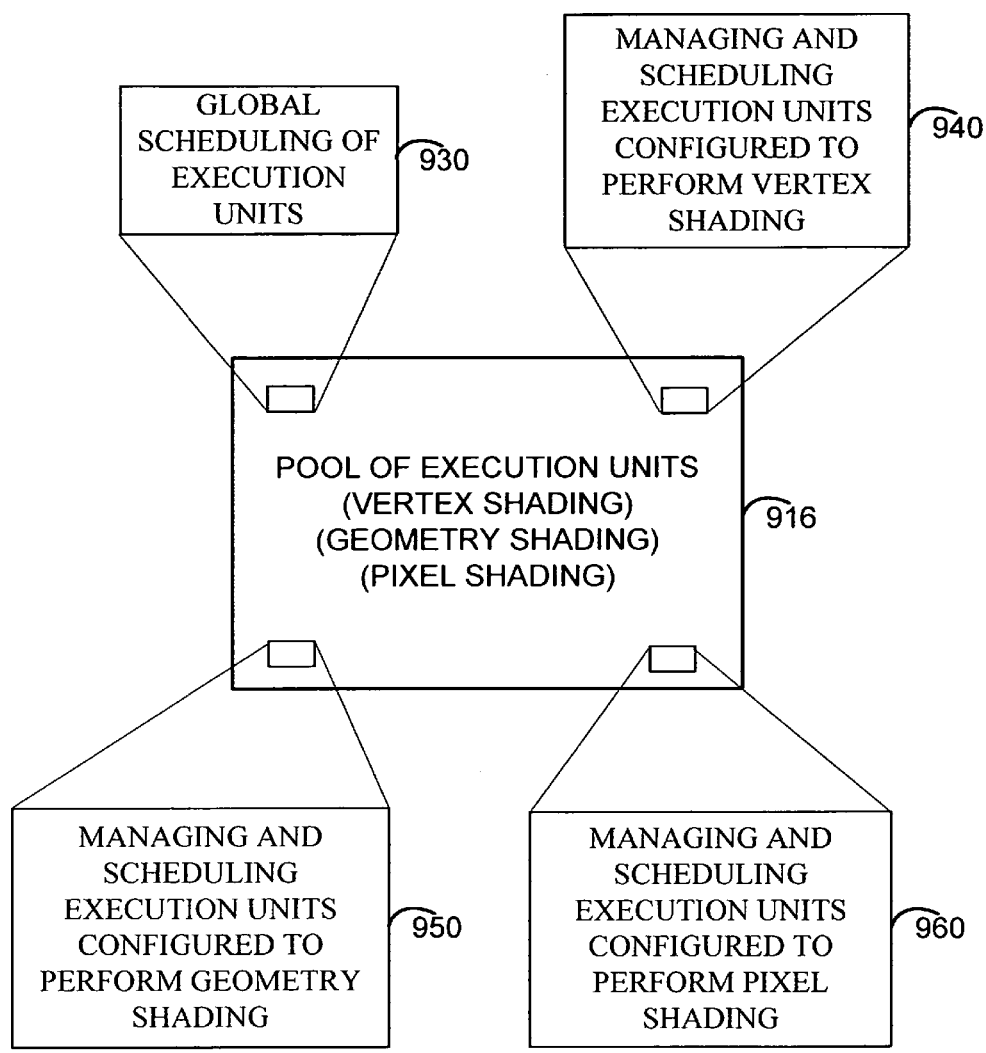

Reference is now made to FIG. 13, in conjunction with FIG. 12. As previously described herein, the pool of execution units 916 comprises a plurality of like execution units, each of which may be configured for multi-threaded processing. At any given time, certain of the execution units (or even certain of the threads) may be configured to carryout pixel shading operations, while other execution units (or threads) are configured to carryout geometry shading and/or vertex shading operations. The configuration, and dynamic re-configuration, of the various execution units (or threads) may be performed on a workload, backlog, and/or demand basis. That is, as demands for shading operations are made, then unused execution units (or threads) may be allocated to perform those operations. As the execution units (or their resources) become unavailable (due to use in performing computations), then the system may perform more intelligent scheduling of these execution units or their resources.

For example, assume that the execution units (or threads) are all configured and assigned to perform designated shading tasks. The system could monitor backlogged requests for shading operation (awaiting processing). If the backlog of pixel shading operations begins to significantly grow, while vertex or geometry shading requests are not becoming backlogged, then the system may reallocate the configuration of execution units (or threads) to reallocate some from vertex or geometry shading operations to pixel shading operations. Such a load balancing will result in increased overall throughout through the pipeline.

As shown in FIG. 13, logic 940 may be provided to manage and/or schedule execution units (or threads) to perform vertex-shading operations. Logic 950 may be provided to manage and/or schedule execution units to perform geometry-shading operations. Similarly, logic 960 may be provided to manage and/or schedule execution units to perform pixel-shading operations. In addition, additional logic 930 may be provided to provide global management or scheduling of the execution units (or threads). This global management or scheduling may be performed in a variety of ways and based on a variety of factors. Factors could include relative demand, backlog, resource consumption, etc.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure. For example, the dynamic scheduling described herein has focused on embodiments having three shaders (a vertex shader, a geometry shader, and a pixel shader). It will be appreciated that embodiments of the invention can also be implemented having only two shaders (e.g., a vertex shader and a pixel shader), or more than three shaders.

What is claimed is:

1. A graphics processing apparatus comprising:
   a plurality of execution units;
   logic configured to measure an output drain rate from the pixel shader; and
   logic configured to assign individual ones of the execution units to perform processing tasks requested by one of a vertex shader, a geometry shader, or a pixel shader, wherein once a given execution unit is assigned to one of the vertex shader, the geometry shader, or the pixel shader, it remains assigned to that shader until reassigned, the logic being further configured to reassign individual ones of the execution units based on a relative workload of the execution units collectively performing vertex shading tasks, execution units collectively performing geometry shading tasks, and execution units collectively performing pixel shading tasks, wherein the logic configured to assign is more specifically configured to assign execution units to a bottlenecked shader unit from less busy shader units in an iterative fashion until a peak or maximal drain rate is established, wherein assigning in the iterative fashion comprises comparing the performance of the reassigned individual ones of the execution units with a plurality of recorded performance based on the peak or drain rate; and logic configured to store the plurality of recorded performance.

2. The graphics processing apparatus of claim 1, wherein the logic is more specifically configured to reassign an execution unit assigned from a least busy one of the vertex shader, the geometry shader, or the pixel shader to one of the other of the vertex shader, the geometry shader, or the pixel shader that is determined to be bottlenecked.

3. The graphics processing apparatus of claim 1, further comprising logic configured to determine whether there is a performance bottleneck in any one or more of the vertex shader, the geometry shader, or the pixel shader.

4. The graphics processing apparatus of claim 1, further comprising:
logic configured to determine whether there is a performance bottleneck in the vertex shader, the logic being configured to determine whether all execution units assigned to the vertex shader are full, while at least one execution unit assigned to the geometry unit has availability;
logic configured to determine whether there is a performance bottleneck in the geometry shader, the logic being configured to determine whether all execution units assigned to the geometry shader are full, while an output vertex cache is not full; and
logic configured to determine whether there is a performance bottleneck in the pixel shader, the logic being configured to determine whether all execution units assigned to the pixel shader are full, while a pixel shader output buffer is not full.

5. The graphics processing apparatus of claim 1, further comprising logic configured to determine the presence of the bottleneck shader unit according to a priority order beginning from an end of a pipeline comprising the vertex shader, the geometry shader, and the pixel shader, and proceeding to a next previous stage in the pipeline until the shader corresponding to the bottleneck is identified.

6. A method for computing graphics operations comprising:
receiving, over time, a plurality of computation requests from each of a vertex shader, a geometry shader, and a pixel shader;
assigning individual ones of said computation requests to individual ones of a plurality of execution units in a pool execution unit, wherein each of the plurality of execution units is identical in design and configurable for programmed operation, and wherein each execution unit is capable of multi-threaded operation;
comparatively evaluating, over time, the performance of all execution units collectively assigned to perform computation requests from the vertex shader, all execution units collectively assigned to perform computation requests from the geometry shader, and all execution units collectively assigned to perform computation requests from the pixel shader; and
reassigning at least one execution unit from one of the vertex shader, geometry shader, and pixel shader to another of the vertex shader, geometry shader, and pixel shader, based on the comparative performance evaluation;
wherein the performance is comparatively evaluated based on the number of execution units allocated to shader stage, the instruction throughput per execution unit, and the ratio between vertices, primitives and pixels of shader stage for the vertex shader, geometry shader and pixel shader collectively.

7. The method of claim 6, further comprising assigning a new computation request to one of the execution units, based on an outcome of the comparatively evaluating operation.

8. The method of claim 7, wherein the new computation request is assigned to a least busy one of the execution units.

9. The method of claim 6, further comprising re-assigning an existing computation request to a different one of the execution units, based on an outcome of the comparatively evaluating operation.

10. The method of claim 9, wherein the existing computation request is re-assigned to a least busy one of the execution units.

11. The method of claim 6, wherein the ratio between the vertices, primitives and pixels of shader stage is constant.

* * * * *